US012619106B2

(12) United States Patent
Andoche et al.

(10) Patent No.: US 12,619,106 B2
(45) Date of Patent: May 5, 2026

(54) METHOD AND APPARATUS FOR DETERMINING A FIT OF A VISUAL EQUIPMENT

(71) Applicant: Essilor International, Charenton-le-Pont (FR)

(72) Inventors: Julien Andoche, Charenton le Pont (FR); Estelle Netter, Charenton le Pont (FR); Fabien Muradore, Charenton le Pont (FR); Xin Pei Zhou, Shanghai (CN)

(73) Assignee: Essilor International, Charenton-le-Pont (FR)

( * ) Notice: Subject to any disclaimer, the term of this patent is extended or adjusted under 35 U.S.C. 154(b) by 342 days.

(21) Appl. No.: 18/260,164

(22) PCT Filed: Dec. 29, 2021

(86) PCT No.: PCT/EP2021/087778
§ 371 (c)(1),
(2) Date: Jun. 30, 2023

(87) PCT Pub. No.: WO2022/161730
PCT Pub. Date: Aug. 4, 2022

(65) Prior Publication Data
US 2024/0069366 A1 Feb. 29, 2024

(30) Foreign Application Priority Data
Jan. 28, 2021 (EP) .................................... 21305107

(51) Int. Cl.
*G02C 13/00* (2006.01)
*G06V 40/16* (2022.01)
*G06V 40/18* (2022.01)

(52) U.S. Cl.
CPC ......... *G02C 13/005* (2013.01); *G06V 40/171* (2022.01); *G06V 40/172* (2022.01); *G06V 40/193* (2022.01); *G06V 40/197* (2022.01)

(58) Field of Classification Search
CPC .. G02C 13/005; G06V 40/171; G06V 40/172; G06V 40/193; G06V 40/197
(Continued)

(56) References Cited

U.S. PATENT DOCUMENTS

2010/0157243 A1* 6/2010 Boutinon ............. G02C 13/005
351/159.75
2013/0321412 A1 12/2013 Coon et al.
(Continued)

FOREIGN PATENT DOCUMENTS

CN 1264474 A 8/2000
CN 105637512 A 6/2016
(Continued)

OTHER PUBLICATIONS

FR 3065821, Clodion Frederic, Device for Measuring 3D Measurements and Views . . . (Year: 2018).*
(Continued)

*Primary Examiner* — Bumsuk Won
*Assistant Examiner* — Rahman Abdur
(74) *Attorney, Agent, or Firm* — Oblon, McClelland, Maier & Neustadt, L.L.P.

(57) ABSTRACT

The present disclosure relates to a method and device for evaluating a fit of visual equipment. In an embodiment, the method (105) includes receiving (110) an image(s) of a face of a user, identifying (115) a subset of eyeglasses from a database that satisfy a preliminary fit threshold, determining (120) an eyeglass rim plane of a candidate eyeglass, determining (125) an eyeglass pads plane of the candidate eyeglass, generating (130) at least one 2D profile of a nose
(Continued)

110 — RECEIVE IMAGE(S) OF USER

115 — IDENTIFY SUBSET OF EYEGLASSES THAT SATISFY PRELIMINARY FIT THRESHOLD

120 — DETERMINE EYEGLASS RIM PLANE OF CANDIDATE EYEGLASS

125 — DETERMINE EYEGLASS PADS PLANE OF CANDIDATE EYEGLASS

130 — GENERATE AT LEAST ONE 2D PROFILE OF NOSE OF USER

140 — GENERATE AT LEAST ONE 2D PROFILE OF NASAL SECTION OF FRAME OF CANDIDATE EYEGLASS

150 — VIRTUALLY DOCK CANDIDATE EYEGLASS ON NOSE OF USER

160 — COMPARE LOCATIONS OF FEATURES OF EYEGLASS RIM TO ONE OR MORE FACIAL LANDMARKS DETECTED IN THE IMAGE(S) OF USER

170 — CALCULATE FINAL FIT OF THE VIRTUALLY DOCKED CANDIDATE EYEGLASS of the user, generating (140) at least one 2D profile of a nasal section of a frame of the candidate eyeglass, virtually docking (150) the candidate eyeglass on the nose of the face of the user, calculating (170), when the virtually docked candidate eyeglass satisfies a secondary fit threshold, a final fit of the virtually docked candidate eyeglass, the final fit being defined by at least one of a comfort criterion and/or an aesthetic criterion.

15 Claims, 16 Drawing Sheets

(58) Field of Classification Search
USPC ......................................................... 351/204
See application file for complete search history.

(56) References Cited

U.S. PATENT DOCUMENTS

| | | |
|---|---|---|
| 2015/0055085 A1 | 2/2015 | Fonte et al. |
| 2015/0055086 A1 | 2/2015 | Fonte et al. |
| 2015/0154322 A1 | 6/2015 | Fonte et al. |
| 2015/0154678 A1 | 6/2015 | Fonte et al. |
| 2015/0154679 A1 | 6/2015 | Fonte et al. |
| 2015/0212343 A1 | 7/2015 | Fonte et al. |
| 2016/0062151 A1 | 3/2016 | Fonte et al. |
| 2016/0062152 A1 | 3/2016 | Fonte et al. |
| 2017/0068121 A1 | 3/2017 | Fonte et al. |
| 2017/0269385 A1 | 9/2017 | Fonte et al. |
| 2018/0299704 A1 | 10/2018 | Fonte et al. |
| 2019/0146246 A1 | 5/2019 | Fonte et al. |
| 2020/0285081 A1 | 9/2020 | Fonte et al. |

FOREIGN PATENT DOCUMENTS

| | | | |
|---|---|---|---|
| CN | 110892315 A | 3/2020 | |
| CN | 111033363 A | 4/2020 | |
| CN | 111461814 A | 7/2020 | |
| EP | 3 214 595 A1 | 9/2017 | |
| FR | 3 016 051 A1 | 7/2015 | |
| FR | 3 024 911 A1 | 2/2016 | |
| FR | 3 065 821 A1 | 11/2018 | |
| WO | WO-99/59106 A1 | 11/1999 | |
| WO | WO 2013/177456 A1 | 11/2013 | |
| WO | WO-2015027196 A1 * | 2/2015 | ........... H04N 23/611 |

OTHER PUBLICATIONS

Combined Chinese Office Action and Search Report issued May 28, 2025 in Chinese Patent Application No. 202160086524.5 (with English translation), 22 pages.
International Search Report & Written Opinion issued Apr. 20, 2022 in PCT/EP2021/087778, filed on Dec. 29, 2021, 14 pages.

* cited by examiner

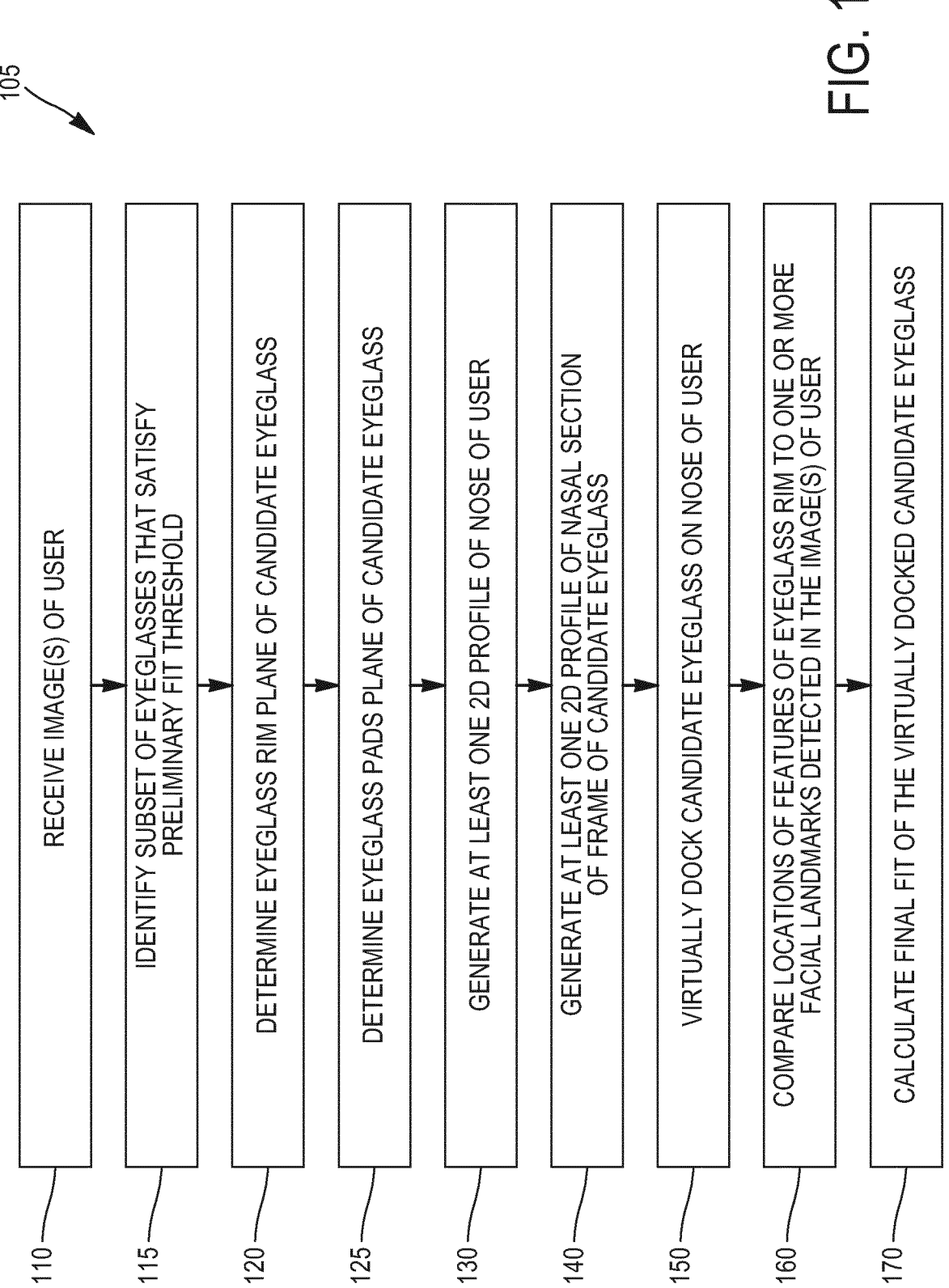

110    RECEIVE IMAGE(S) OF USER

115    IDENTIFY SUBSET OF EYEGLASSES THAT SATISFY PRELIMINARY FIT THRESHOLD

120    DETERMINE EYEGLASS RIM PLANE OF CANDIDATE EYEGLASS

125    DETERMINE EYEGLASS PADS PLANE OF CANDIDATE EYEGLASS

130    GENERATE AT LEAST ONE 2D PROFILE OF NOSE OF USER

140    GENERATE AT LEAST ONE 2D PROFILE OF NASAL SECTION OF FRAME OF CANDIDATE EYEGLASS

150    VIRTUALLY DOCK CANDIDATE EYEGLASS ON NOSE OF USER

160    COMPARE LOCATIONS OF FEATURES OF EYEGLASS RIM TO ONE OR MORE FACIAL LANDMARKS DETECTED IN THE IMAGE(S) OF USER

170    CALCULATE FINAL FIT OF THE VIRTUALLY DOCKED CANDIDATE EYEGLASS

Above view of nose contour

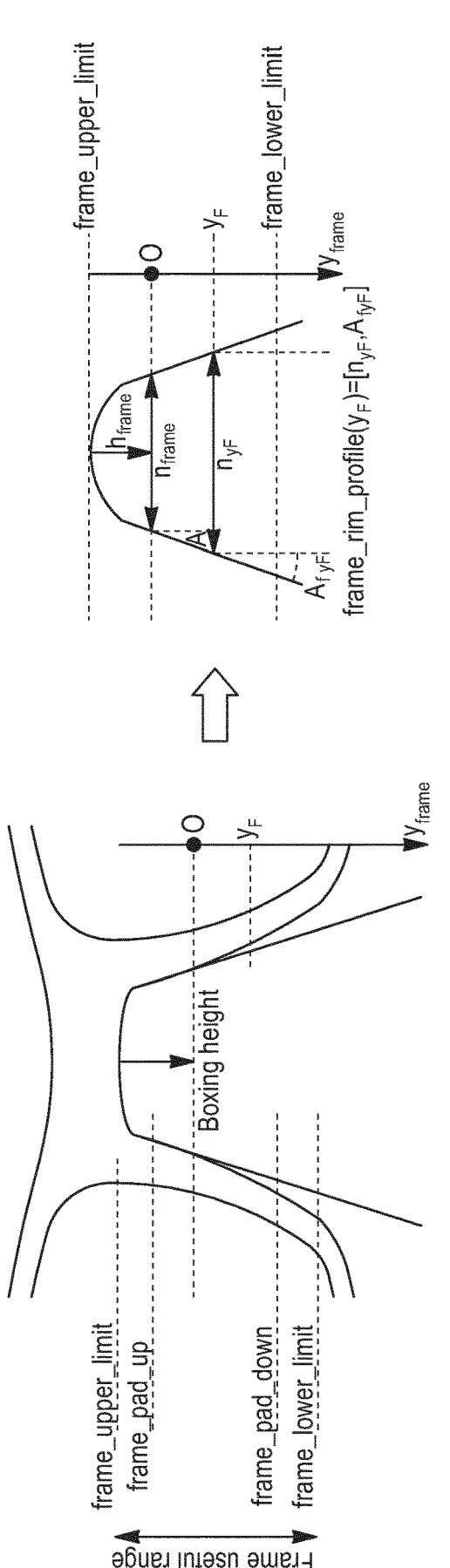
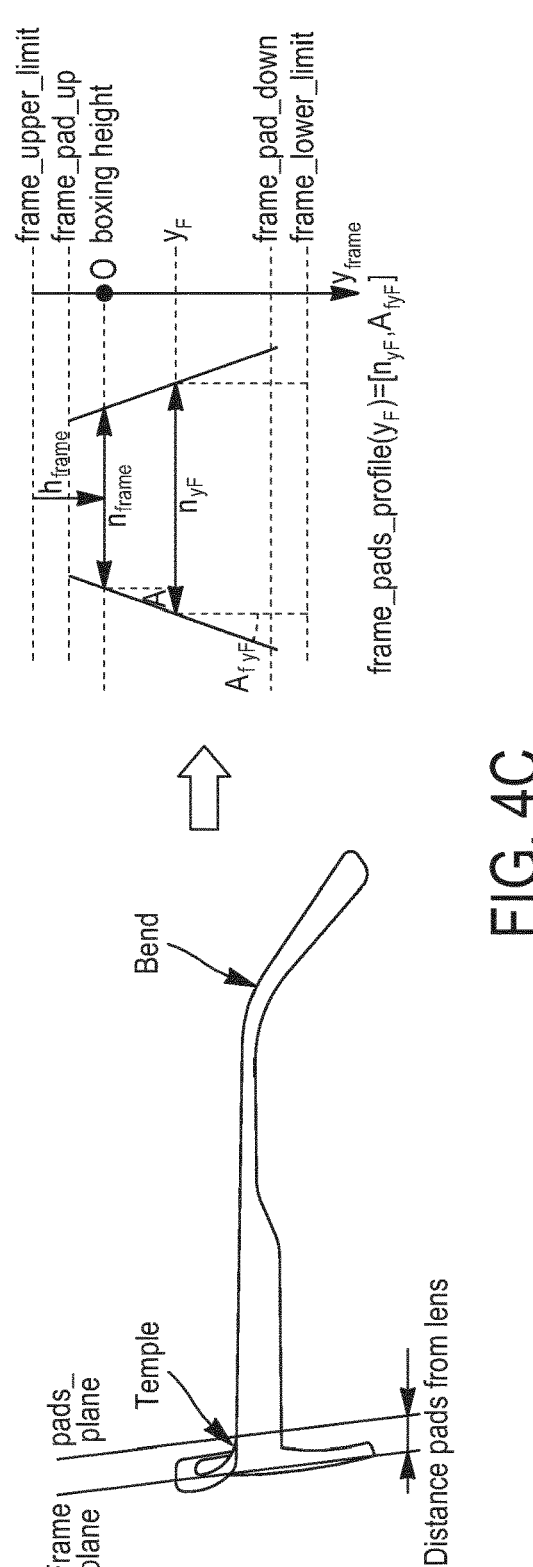
FIG. 4C

Find $Y_{SOL\,frame}$
where $n_{frame} = n_{face}$
on pads_profile

Frame put on nose at $y_N$ level,
so that $n_{frame} = n_{face}$

KO

Frame put on nose at $y_N$ level,
so that $n_{frame} = n_{face}$

OK

Eyeglass points

Eyeglass B-spline model

Nose points

Nose B-spline model eyeglass profile nose profile

METHOD AND APPARATUS FOR DETERMINING A FIT OF A VISUAL EQUIPMENT

BACKGROUND

Field of the Disclosure

The present disclosure relates to a method for determining a virtual fit of an eyewear on a face of a user based on comfort and aesthetics. A properly fitting eyewear is an essential step to ensuring desired optical performance.

Description of the Related Art

Selecting new eyewear can be daunting, as brick and mortar retailers, online retailers, and combinations thereof offer myriad options for your eye care needs. Brick and mortar retailers fail to provide sufficient inventory and convenience for the modern consumer. Online businesses strive to provide consumer-specific recommendations, but are often unable to determine a best fit of a given eyewear product for a consumer due to a lack of physical interaction with the physical proportions of the consumer. Similarly, consumer uncertainty regarding fit often leads to in-person try-ons and fittings. While providing increased consumer confidence for their eyewear purchase when a good fit can be found, limiting a consumer to in-store inventory and the pressures associated with a public try-on can complicate and dampen the shopping experience.

Document FR 3 065 821 A1 discloses a device for obtaining measurements and 3D images for determining morphological parameters of the face in order to make made-to-measure eyeglasses.

Document WO 2015/027196 A1 discloses a method and system to create custom products from scratch.

In order to exploit the convenience and inventory of online eye care services, a new approach to determining fit of eyeglasses, or visual equipment, is needed. If a fit quality of a virtual try-on of an eyeglass frame can be determined, then it may be possible to recommend an eyeglass with confidence.

Thus, in order to provide an online eye care experience that generates personalized product recommendations and guarantees a good fit, a new approach is required.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure relates to an apparatus and method for determining a fit of a visual equipment.

According to an embodiment, the present disclosure further relates to a method for determining a fit of a visual equipment according to claim 1.

According to an embodiment, the present disclosure further relates to an apparatus for determining a fit of a visual equipment according to claim 13.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a flow diagram of a method of determining a fit of a visual equipment, according to an exemplary embodiment of the present disclosure;

FIG. 4C is an illustration of a step of a sub process of a method of determining a fit of a visual equipment, according to an exemplary embodiment of the present disclosure;

DETAILED DESCRIPTION

Figure 2A:
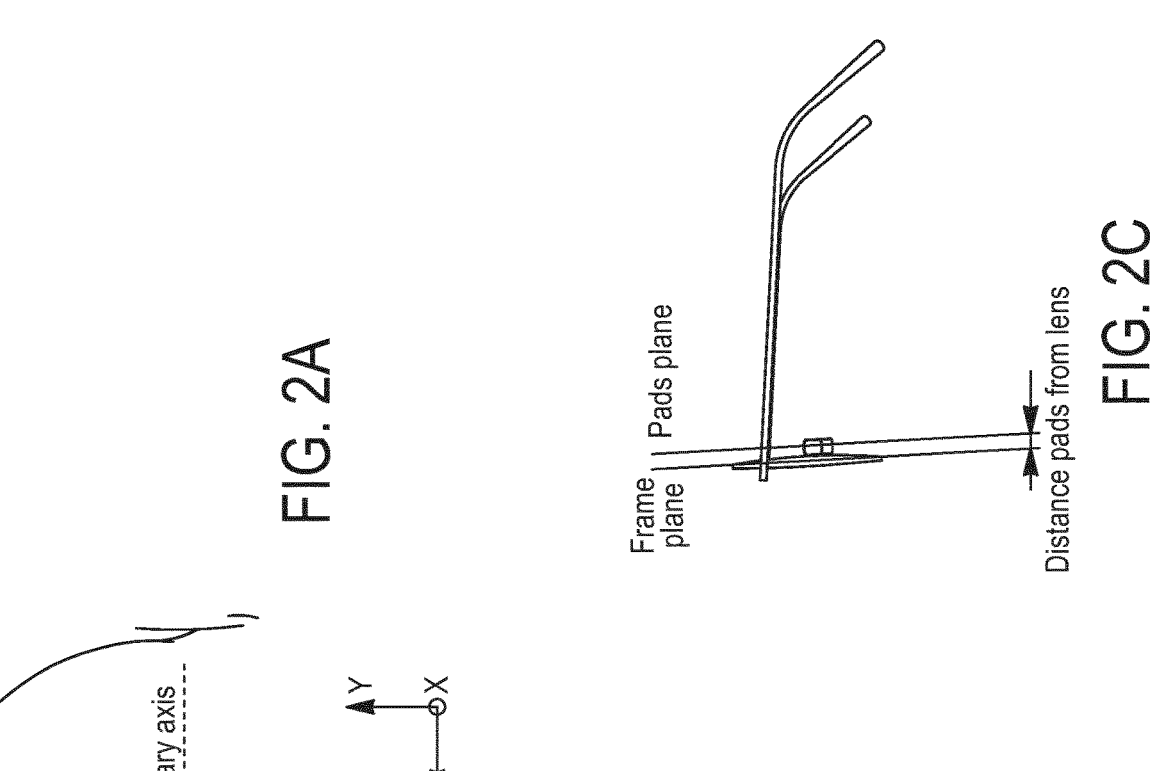
FIG. 2A is an illustration of a step of a method of determining a fit of a visual equipment, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The terms "visual equipment" and "eyeglass" may be used interchangeably herein. Similarly, the terms "consumer" and "user" may be used interchangeably herein, as appropriate.

Consumers looking to online retailers for eye care products are asked to cull through what seems to be an infinite number of frame designs in order to select their preference regarding eyeglass, or visual equipment, design. Typically, as a result of this overwhelming experience, consumers seek out brick and mortar retailers that can provide a real life try-on experience, allowing the consumer to evaluate how the visual equipment looks and feels on their face. For instance, the consumer can become confident in the comfort, size, and aesthetic appeal of the visual equipment.

The expectation of online eye care services in the future, therefore, must be to recommend an appropriate visual equipment to a consumer, the appropriate visual equipment having been determined to satisfy various elements of fit, including comfort, size, and aesthetic appeal.

To this end, a method is needed that can (1) automatically score, for a given face of a consumer, all available visual equipment in a visual equipment database (i.e. catalogue) according to comfort criteria (e.g. comfort on nose, comfort on ear, comfort on temples and cheeks) and/or aesthetic criteria (e.g. matching of face shape, face color, face proportions with visual equipment shape, visual equipment color, visual equipment general aspect, lens geometry, prescription data, lens tint, etc.), (2) display the scores in a useful way to the consumer, and (3) predict, for the given face of the consumer, if a given visual equipment would be a good fit.

In an embodiment, the method may include automatically scoring, for the given face of the consumer, all available visual equipment in the visual equipment database according to an estimate of a felt weight of the visual equipment.

According to an embodiment, the present disclosure describes a method of determining a fit of a visual equipment for a face of a user. The determining the fit may be iteratively performed for each visual equipment of a visual equipment database. The determined fit may include evaluation of comfort criteria, aesthetic criteria, and felt weight of the visual equipment.

In an embodiment, the method includes generating a nose contour of a nose of a user and eyeglass-based planes that inform positioning of a candidate eyeglass during virtual docking and the like. The generated nose contour of the nose of the user may be an estimated nose contour, or estimated nose model. The estimated nose contour may be a three-dimensional (3D) estimated nose contour.

In an embodiment, the virtual docking may be integrated with virtual try on in order to provide, to a user, an augmented reality experience.

In an embodiment, the method includes generating at least one two-dimensional (2D) profile of the nose of the user and at least one 2D profile of the candidate eyeglass. The at least one 2D profile of the candidate eyeglass includes a nose key of the candidate eyeglass.

In an embodiment, the method includes virtually docking the candidate eyeglass on the nose of the user according to the at least one 2D profile of the nose of the user and the at least one 2D profile of the candidate eyeglass.

In an embodiment, the method includes evaluating a positioning of the virtually docked candidate eyeglass relative to facial landmarks of the user, the evaluation indicating whether the virtually docked candidate eyeglass is an acceptable fit and should be considered further.

In an embodiment, the method includes scoring candidate eyeglasses that achieve an acceptable fit, the scores defining values of comfort criteria, aesthetic criteria, and felt weights.

Referring now to the Drawings, FIG. 1 provides a flow diagram of a method of the present disclosure. Method 105 of FIG. 1 will be described as applied to a single visual equipment, or eyeglass, of a visual equipment subset, or subset of eyeglasses, of a visual equipment database, or eyeglass database. It should be appreciated that method 105 can be performed iteratively for each visual equipment within the visual equipment subset in order to determine which visual equipment fit the user and to determine scores related to the fit of the visual equipment on the user.

Accordingly, at step 110 of method 105, image(s) of the user can be received. In an embodiment, the image(s) of the user can be one or more 2D images and/or one or more 3D image datasets. The image(s) can be of the face of the user. The one or more 2D images may be two 2D images, a first image being of a front view of the face of the user and a second image being of a profile view of the face of the user.

In an embodiment, morphological data of the user may be determined from the received image(s). For instance, the two 2D images may include a scaling factor that enables facial measurements (in metric or Imperial or other measurement systems) to be determined therefrom. In an example, the scaling factor may be determined using a ruler, card having standard dimensions, or any object with universally-known dimensions. In another example, the scaling factor may be determined by using a feature of the face of the user, such as a pupillary distance or other morphological distance known on the face of the user. Ain another example, the scaling factor can be obtained knowing the distance of measurement and the focal length of the camera. In another example, the scaling factor can be directly extracted from the 3D image dataset of the face of the user.

In an embodiment, the morphological data of the user may be provided directly to method 105 in addition to or in lieu of image(s) of the user.

At step 115 of method 105, a subset of eyeglasses from an eyeglass database can be identified relative to the user.

To this end, eyeglass data for each eyeglass within the eyeglass database must be obtained. Similarly to step 110 of method 105, eyeglass data may be generated based on image(s) of each eyeglass of the eyeglass database. The image(s) of each eyeglass may be one or more 2D images and/or one or more 3D image datasets. The image(s) of each eyeglass may be two 2D images, a first image being of a front view of the eyeglass and a second image being of a profile view of the eyeglass.

In an embodiment, eyeglass feature data may be determined from the image(s). For instance, the two 2D images may include a scaling factor that enables eyeglass feature measurements (in metric or Imperial or other measurement systems) to be determined therefrom. In an example, the scaling factor may be determined by a known dimension of the eyeglass such as a frame width, a frame height, a temple length, and the like. In another example, the scaling factor may be determined by another object of universally-known size that is positioned within the field of view of the image(s). In another example, the scaling factor may be determined directly from the 3D image dataset of the frame.

In an embodiment, the eyeglass feature data may be provided directly to method 105 in addition to or in lieu of image(s) of the eyeglass. For instance, the eyeglass feature data may be provided by a manufacturer or wholesaler of the eyeglass.

In another embodiment, the eyeglass feature data may be a combination of data determined from the image(s) and data provided directly to method 105 by a manufacturer or wholesaler of the eyeglass. For instance, a shape, a material composition, a color, and dimensions of the eyeglass may be obtained directly from the manufacturer or the wholesaler while a facial angle, a splay angle, and the like may be determined from the image(s).

Returning now to step 115 of method 105, and after obtaining morphological data about the face of the user and eyeglass feature data about eyeglasses within the eyeglass database, an initial screening of the eyeglass database can be performed. The initial screening, or pre-filter, can include a comparison of the face of the user to each eyeglass of the eyeglass database. This comparison may be related to comfort, to aesthetics, or both. The comparison related to comfort may be based on an adaptation of each eyeglass of the eyeglass database to a facial width of the user.

To this end, a first approach includes measuring, as the facial width of the user, a temporal width ($T_{face}$) of the user. In an embodiment, the temporal width may be determined directly using the first image of the front view of the face of the user or a 3D image dataset of the face of the user. In another embodiment, the temporal width of the user can be determined indirectly. First, a sphenoidal width ($S_{face}$) can be measured from the first image of the front view of the face of the user. The sphenoidal width can then be used to estimate the temporal width ($T_{face}$) of the face of the user. In addition to $S_{face}$, the estimation of $T_{face}$ can be based on gender information and detected pupil distance. The gender information (G) can be entered as, for males, $G_m=10$, and $G_f=5$ for females. With that information, the temporal width can be calculated as $T_{face}=S_{face}+G+c_T*PD$, where $c_T$ is a hyperparameter tuned according to a training dataset.

In order to determine if a given eyeglass does or does not satisfy an initial fit threshold, the calculated temporal width can be compared with an eyeglass total width, or ve_total_width, determined for each eyeglass of the eyeglass database. The total width determined for each eyeglass of the eyeglass database is defined as the widest distance of the eyeglass pads plane, excluding arms of the eyeglass. A deviation limit of the eyeglass total width from the temporal width, or diff_temp_width_ve_total_width, can be defined as the initial fit threshold. Accordingly, if $|T_{face}-$ve_total_width$|>$diff_temp_width_ve_total_width, then the visual equipment is eliminated at the pre-filtering step and the presently considered eyeglass is considered as not being a comfortable fit.

A second approach includes measuring, as the facial width of the user, an auricular width ($A_{face}$) of the user. In an embodiment, the auricular width may be determined directly using the first image of the front view of the face of the user or a 3D image dataset of the face of the user. In another embodiment, the auricular width of the user can be determined indirectly. First, a sphenoidal width ($S_{face}$), or a temporal width ($T_{face}$), can be measured from the first image of the front view of the face of the user. The sphenoidal width or the temporal width can then be used to estimate the auricular width ($A_{face}$) of the user. In addition to $S_{face}$ or $T_{face}$, the estimation of $A_{face}$ can be based on gender information and detected pupil distance. The gender information (G) can be entered as, for males, $G_m=20$, and $G_f=13$ for females. With that information, and assuming the sphenoidal width is used, the auricular width can be calculated as $A_{face}=S_{face}+G+c_A*PD$, where $c_A$ is a hyperparameter tuned according to a training dataset.

Having determined the auricular width, and in order to determine if a given eyeglass does or does not satisfy an initial fit threshold, a temple openness (temple_openness) of a given eyeglass must be determined. In an embodiment, the temple openness may be determined directly using the first image of the front view of the eyeglass or a 3D image dataset of the eyeglass. For instance, ve_total_width can be compared to a distance between distal ends of the temples of the eyeglass. From a transverse view, the temple openness is a measure of how medial the distal ends of the temples of the eyeglass are relative to the ve_total_width. In another embodiment, the temple openness of the eyeglass can be determined indirectly. The indirect determination of temple openness can be based on information of the material that is used for each arm of the eyeglass (in order to deduce rigidness of the temples). This information informs possible optical guidelines that can be used. For instance, thin and smooth temples indicate a temple openness of –15 mm, semi-rigid temples indicate a temple openness of –10 mm, rigid or strong temples indicate a temple openness of –5 mm, and very rigid temples indicate a temple openness of around –2-3 mm.

The temple openness and the total width of the eyeglass can be used to determine an eyeglass width at ear level, or ve_width_at_ear_level. In this way, ve_width_at_ ear_level=ve_total_width+temple_openness.

Accordingly, in order to determine if a given eyeglass does or does not satisfy an initial fit threshold, a deviation limit of the auricular width from the eyeglass width at ear level, or diff_aur_width_ve_width_at_ear_level, can be defined as the initial fit threshold. Accordingly, if $|A_{face}-$ ve_width_at_ear_level|>diff_aur_width_ve_width_at_ear_ level, then the visual equipment is eliminated at the pre-filtering step and the presently considered eyeglass is considered as not being a comfortable fit from the comfort aspect.

In an embodiment, the comparison related to aesthetics may be based on an adaptation of each eyeglass of the eyeglass database, in particular shape and color, to a facial shape and/or skin color and/or eye color.

To this end, a first approach includes categorizing the facial shape of the user on one side, and the eyeglass frame shape on the other side, into several shape categories, respectively. For instance, the shape categories for facial shapes may include square, rectangular, heart, diamond, round, and oval. The shape categories for eyeglass frame shape may include square, rectangular, round, pantos, and D-shape, among others.

In an embodiment, the facial shape may be determined indirectly. First, a temporal width ($d_1$) can be determined at step 115 of method 105, resulting in a vertical position of the temple ($y_1$) as a starting level. With the vertical position of the lowest point of the jaw ($y_{20}$) as an end level, $y_2$, $y_3$, . . . , $y_{19}$ can be determined therebetween from the starting level to the end level, each level having the same vertical distance from its adjacent levels. Then, using the facial landmarks information around the jaw area, the maximum width on face $d_2$, $d_3$, . . . , $d_{19}$ can be calculated, accordingly. Based on the absolute and relative values of these widths, one of the shape categories listed above can be selected as the facial shape.

In an embodiment, the eyeglass frame shape can be obtained directly from the manufacturer or retailer frame data. In another embodiment, the eyeglass frame shape may be obtained indirectly. To this end, one (e.g. left or right) of the eyeglass frame lens regions can be extracted from one of the eyeglass frame images, and the curvature of the region can be calculated therefrom. Then, the numerical curvature value may be converted into different shape categories that are listed above as the skin shape. Finally, a predefined binary shape matching matrix can be used to evaluate the fitness of the eyeglass frame. If the evaluation fails, then the visual equipment is eliminated at the pre-filtering step and the presently considered eyeglass is considered as not being a valid fit from the aesthetics aspect.

A second approach includes categorizing the skin color of the user on one side, and the eyeglass frame color on the other side, into several color categories, respectively. For instance, light, olive, dark, and the like, can be used as categories for skin colors and black, blue, pink, white, and the like, can be used as categories for eyeglass frame color.

In an embodiment, the skin color may be determined indirectly. With the facial landmark information, the region of cheek can be extracted, and the average RGB values of that region can be calculated. Then, the numerical RGB values can be converted into different color categories that are listed above as the skin color.

In an embodiment, the eyeglass frame color may be obtained directly from the eyeglass frame manufacturer or retailer frame data. In another embodiment, the eyeglass frame color may be determined indirectly. This can be done by extracting the eyeglass frame contour region from one of the eyeglass frame images and calculating the average RGB values in that region. Then, the numerical RGB values can be converted into different categories that are listed above as the eyeglass frame color. Finally, a predefined binary color matching matrix is used to evaluate the fitness of the frame. If the evaluation fails, then the visual equipment is eliminated at the pre-filtering step and the presently considered eyeglass is considered as not being a comfortable fit from the aesthetics aspect.

Returning now to FIG. 1 after having pre-filtered the eyeglass database to identify a subset of eyeglasses for consideration, method 105 proceeds to step 120 and the remaining steps and sub process of method 105 will be described in view of a single eyeglass, or candidate eyeglass, appreciating that method 105 can be performed iteratively.

Next, at step 120 of method 105, an eyeglass rim plane, or "frame plane", of a candidate eyeglass can be determined. It can be appreciated that the main purpose of an eyeglass is to guarantee that lenses of the eyeglass are placed at a relevant distance from eyes of the user, and at the optical center of the lens, to offer the best optical performance to the wearer. For this reason, the eyeglass rim plane is defined such that the position of the eyeglass rim relative to the eyes of the user is a fixed constraint. In an example, the eyeglass rim plane includes a bridge, a lens, and a nose key rim, among others.

In an embodiment, the eyeglass rim plane can be defined by one or more parameters. A first parameter may be a vertex distance (VD), which is defined as a horizontal distance from the eyeglass rim plane to the center of the cornea of eyes of the user. A second parameter may be a pantoscopic angle (i), which is defined as an angle between the eyeglass rim plane and a coronal plane, or vertical plane, of the user. VD and i are illustrated in FIG. 2A. Ideal instances of these two parameters can be determined using one of a variety of methods. In an example, sales statistics of eyeglass sales, accounting for factors such as ethnicity, lens usage, prescription, eye pupillary distance (PD), fitting height, A, B, D distance, lens contour, and the like, can be used to determine an ideal VD, or $VD_{ideal}$. In some cases, $VD_{ideal}$ can be replaced by $wrap_{ideal}$. Associated values for $VD_{ideal}$ and $wrap_{ideal}$ can be regular values or personalized within groups or by individuals. In this way, $i_{ideal}$ can be statistical i based on the sales statistics. Thus, the two parameters may be determined as $VD_{real}$ and a statistical $i_{real}$. In another example, the image(s) of the user received at step 110 of method 105 may include image(s) of the user wearing a personal eyeglass. The image(s) of the user wearing the personal eyeglass may be 2D image(s) or a 3D image. In this way, vertex distance, pantoscopic angle, wrap angle, and the like, can be determined. In some cases, this information can be determined from a fitting measurement. Moreover, using the received image(s), a real-life VD and pantoscopic angle, i, can be determined. Thus, the two parameters may be determined as $VD_{real}$ and $i_{real}$. In cases where image(s) of the user are available, certain landmarks may be hidden by the eyeglass rim. A photo of the user without the personal eyeglass can be used and homography can be calculated by the landmarks.

In an embodiment, pantoscopic angle can be determined from a side-view 2D image(s). From the side-view 2D image(s), the eyeglass bridge position and lens bottom position can be detected. The detection allows for an estimation of the eyeglass rim plane and a computation of the pantoscopic angle. Additionally, the cornea summit can be detected from the side-view 2D image(s) and used in combination with the eyeglass rim plane to compute the vertex distance. Furthermore, when employed, the wrap angle can be estimated from an estimation of positions of the hinges of the eyeglass and based on the detected eyeglass bridge position.

According to an embodiment, if the eyeglass rim plane cannot be placed at VD_ideal, $i_{ideal}$, and/or $wrap_{ideal}$, because it contacts the eyebrows arch, then two approaches may be implemented. A first approach includes increase VD until the eyeglass rim plane no longer contacts the eyebrows arch. A second approach includes maintaining $VD_{ideal}$, $i_{ideal}$, and/or $wrap_{ideal}$, as determined, and limiting a diameter of possible candidate eyeglass rims in order to avoid contact with the eyebrows arch. Thus, the maximum diameter of the eyeglass rim can be calculated after the frame is docked upon the nose, as will be described in subsequent sections.

Having determined the eyeglass rim plane at step 120 of method 105, step 125 of method 105 describes determining an eyeglass pads plane, or "pads plane", of the eyeglass.

Figure 2B:
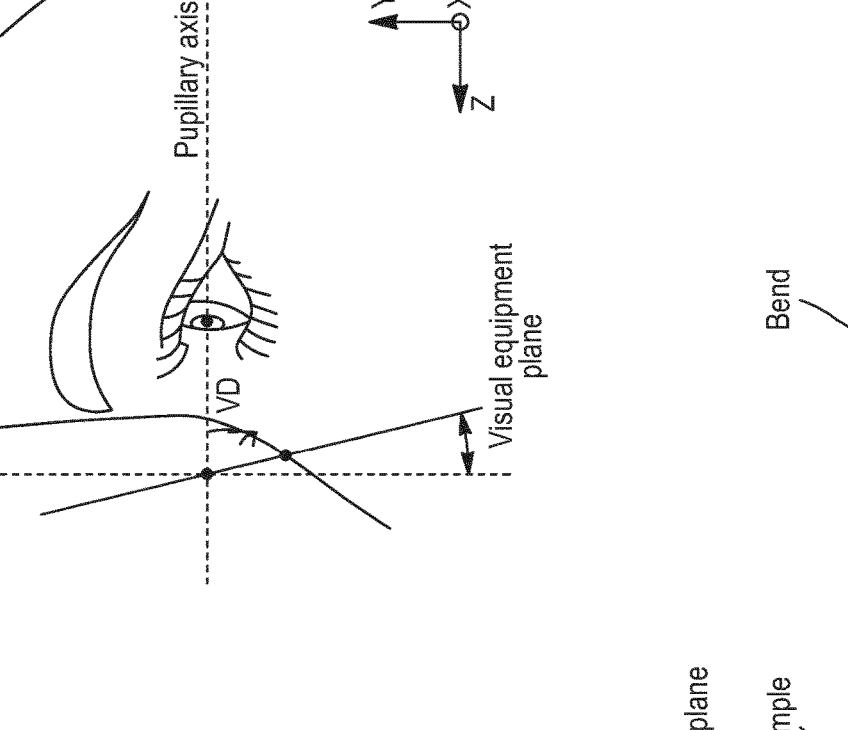
FIG. 2B is an illustration of a step of a method of determining a fit of a visual equipment, according to an exemplary embodiment of the present disclosure.

Many eyeglasses include eyeglass pads that ease positioning of the eyeglass on the nose. Thus, as shown in FIG. 2B, determining the eyeglass pads plane is essential to docking a candidate eyeglass on a nose of a user. In an embodiment, the eyeglass pads plane can be considered as being located at a specific position relative to geometry of the eyeglass pads. In an embodiment, the eyeglass pads plane is more than one eyeglass pads plane and is defined at different aspects of the eyeglass pads. In an example, the eyeglass pads plane is a single plane and is located at the middle of the eyeglass pads. This implies that, in an embodiment, the eyeglass pads plane can be located at a specific distance (distance_pads_from_lens) from the eyeglass rim plane.

In an embodiment, the eyeglass pads plane can be defined relative to the eyeglass rim plane.

In an embodiment, distance_pads_from_lens can be measured dynamically for each candidate frame.

In an embodiment, distance_pads_from_lens can be estimated statistically using information from manufacturers (e.g., the eyeglass pads are usually located at a distance of 4 mm from the eyeglass rim).

Figure 2C:
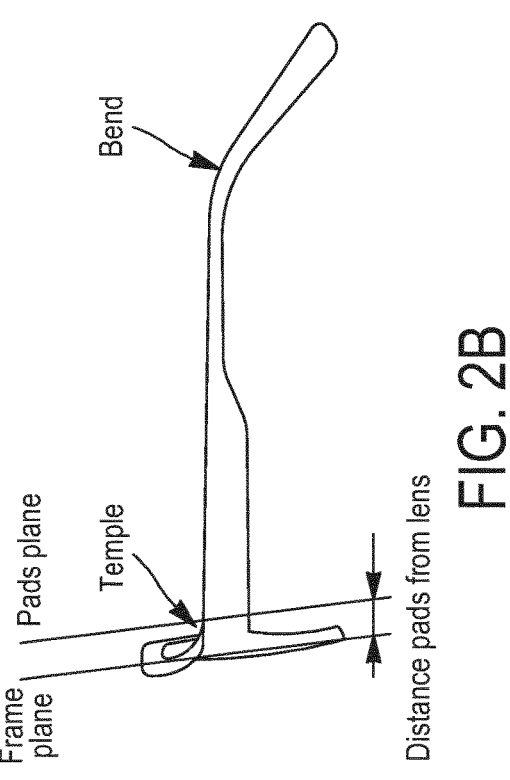
FIG. 2C is an illustration of a step of a method of determining a fit of a visual equipment, according to an exemplary embodiment of the present disclosure.

In an embodiment, the eyeglass pads may be fixed, as in FIG. 2B. In another embodiment, the eyeglass pads may be flexible rotating pads, as in FIG. 2C. Such variation in the eyeglass pads will be discussed later.

Returning now to FIG. 1, and in order to be able to place the eyeglass upon the nose of the user, method 105 proceeds to sub process 130, wherein at least one 2D profile of the nose of the user are generated. The at least one 2D profile of the nose of the user are generated such that a 2D nose profile can be iteratively browsed in an effort to dock the eyeglass pads plane upon the nose. To do this, landmarks of the nose of the user must be identified. Such landmarks can include, in an embodiment, a highest possible point of contact between the eyeglass pads plane and the nose of the user and a corresponding contact point between the eyeglass rim plane of the eyeglass and the nose of the user.

Figures 3A, 3B:
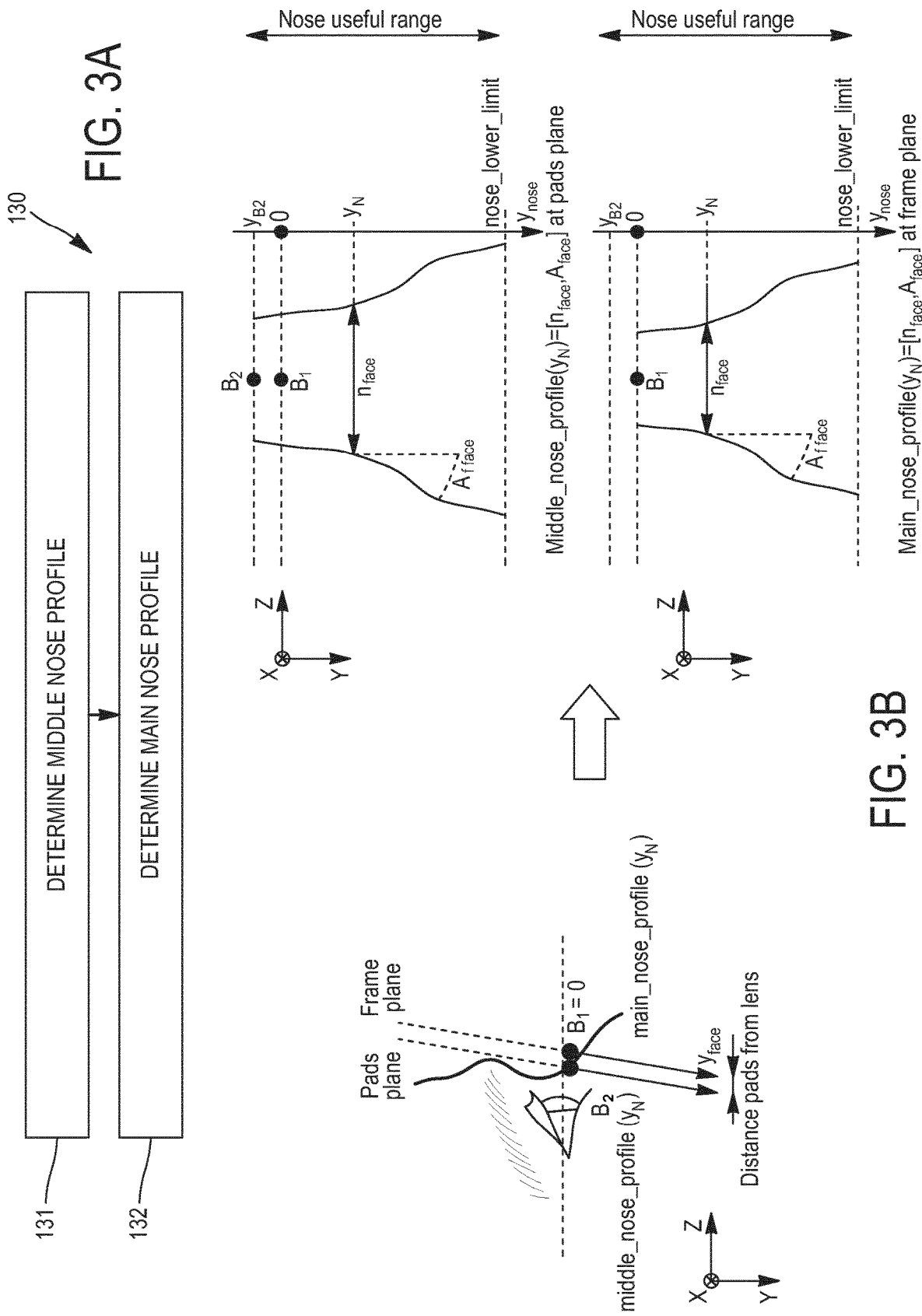
FIG. 3A is a flow diagram of a sub process of a method of determining a fit of a visual equipment, according to an exemplary embodiment of the present disclosure.
FIG. 3B is an illustration of a step of a sub process of a method of determining a fit of a visual equipment, according to an exemplary embodiment of the present disclosure.

Sub process 130 of method 105 is described in greater detail with reference to FIG. 3A through FIG. 3E. With regard to FIG. 3A, the objective is to generate at least one 2D profile of the nose of the user. A first one of the at least one 2D profile of the nose of the user may be a middle nose profile determined at step 131 of sub process 130, the first one of the at least one 2D profile of the nose of the user corresponding to a 2D profile of the nose as the intersection of the nose contour with the eyeglass pads plane. Mathematically, the middle nose profile may be described as middle_nose_profile($y_N$)→($n_{face}$, $A_{face}$) for any $y_N$∈[0; nose_lower_limit]. A second one of the at least one 2D profile of the nose of the user may be a main nose profile determined at step 132 of sub process 130, the second one of the at least one 2D profile of the nose of the user corresponding to a 2D profile of the nose as the intersection of the nose contour with the eyeglass rim plane. Mathematically, the main nose profile may be described as main_ nose_profile($y_N$)→($n_{face}$, $A_{face}$) for any $y_N$∈[0; nose_lower_ limit]. $n_{face}$ and $A_{face}$ reflect a nasal width and a facial angle, respectively, at $y_N$ level of the nose. nose_lower_limit, the lower limit of the nose, may be determined as a physical lower-most point of the nose that may support an element of the eyeglass. In other words, nose_lower_limit can be defined as the height level of the nose for which the curvature of the nose is inverted. The above-description, at a high level, is illustrated in FIG. 3B.

In order to determine the middle nose profile and the main nose profile, different strategies may be employed based on the type of image(s) of the user that are received at step 110 of method 105.

In an embodiment, if the image(s) of the user include a 2D front view of the face of the user, it may be used with an estimation of a standard nose splay angle to determine the at least one 2D profile of the nose of the user. To this end, the hypothesis is made that facial landmarks detected within the 2D front view of the face of the user, such as those in FIG. 3C, correspond to a 2D profile of a nose basis, or base_nose_profile, which can be observed as an intersection of the nose with a plane, or "nose base plane", that passes through the root of the nose and the wing of the nose. The nose base plane can be observed in FIG. 3C. Thus, shown in FIG. 3C, B, B1, and B2 can be retrieved, with B being the nose root and B1 and B2 being the highest possible points of contact, respectively, between the eyeglass pads plane and the eyeglass rim plane with the nose.

In an embodiment, a base_nose_profile($y_N$) can be computed directly from the facial landmarks B, B1, and B2. middle_nose_profile($y_N$) can be computed from base_nose_profile($y_N$) by applying a transformation. The applied transformation may be a reduction transformation, in an example. To do so, a function splay($y_N$), which simulates nose splay angle, is incorporated into the following:

$$n_{middle\_nose\_profile}(y_n)n_{base\_nose\_profile}(y_N)- \\ distance\_nose\_base\_plane\_pads\_plane*tan(splay \\ (y_N)) \qquad (1)$$

$$Af_{middle\_nose\_profile}(y_N)=Af_{base\_nose\_profile}(y_N) \qquad (2)$$

Subsequently, middle_nose_profile is limited to the range [$Y_{B2}$, nose_lower_limit]. Similarly to the above, main_ nose_profile($y_N$) can be calculated from middle_nose_pro-file($y_N$) by applying a transformation thereto. The transformation may be a reduction transformation, in an example. As above, a function splay($y_N$) can be incorporated into the following:

$$n_{main\_nose\_profile}(y_n)n_{middle\_nose\_profile}(y_N) - distance\_pads\_from\_lens*tan(splay(y_N)) \quad (3)$$

$$Af_{main\_nose\_profile}(y_N) - Af_{middle\_nose\_profile}(y_N) \quad (4)$$

Figure 3D:
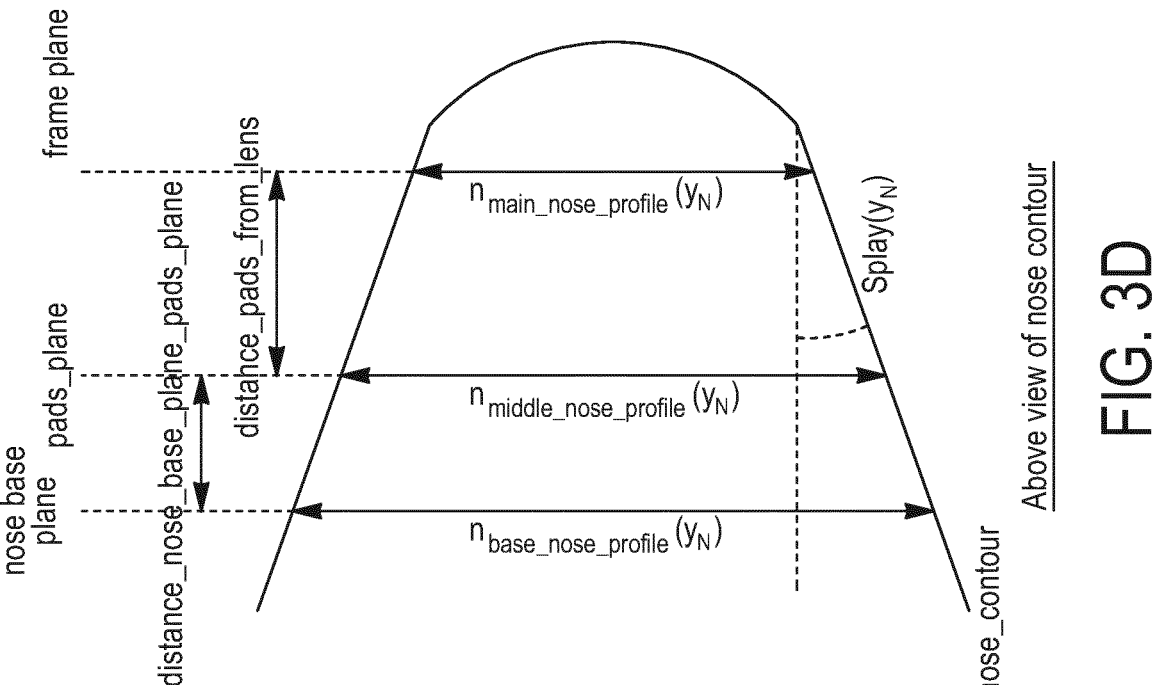
FIG. 3D is an illustration of a step of a sub process of a method of determining a fit of a visual equipment, according to an exemplary embodiment of the present disclosure.
Figure 3C:
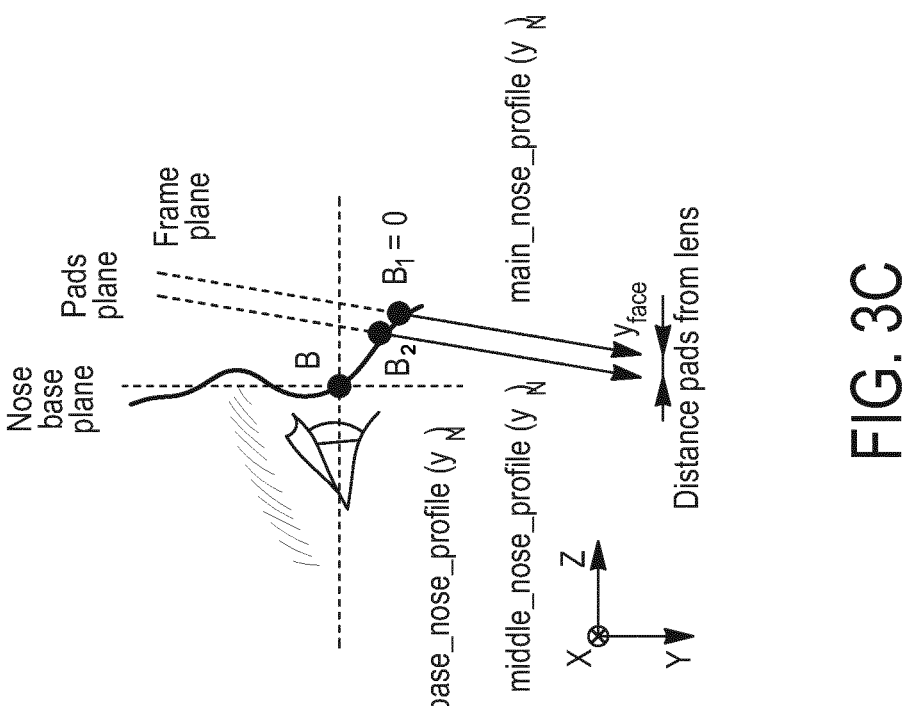
FIG. 3C is an illustration of a step of a sub process of a method of determining a fit of a visual equipment, according to an exemplary embodiment of the present disclosure.
Figure 3E:
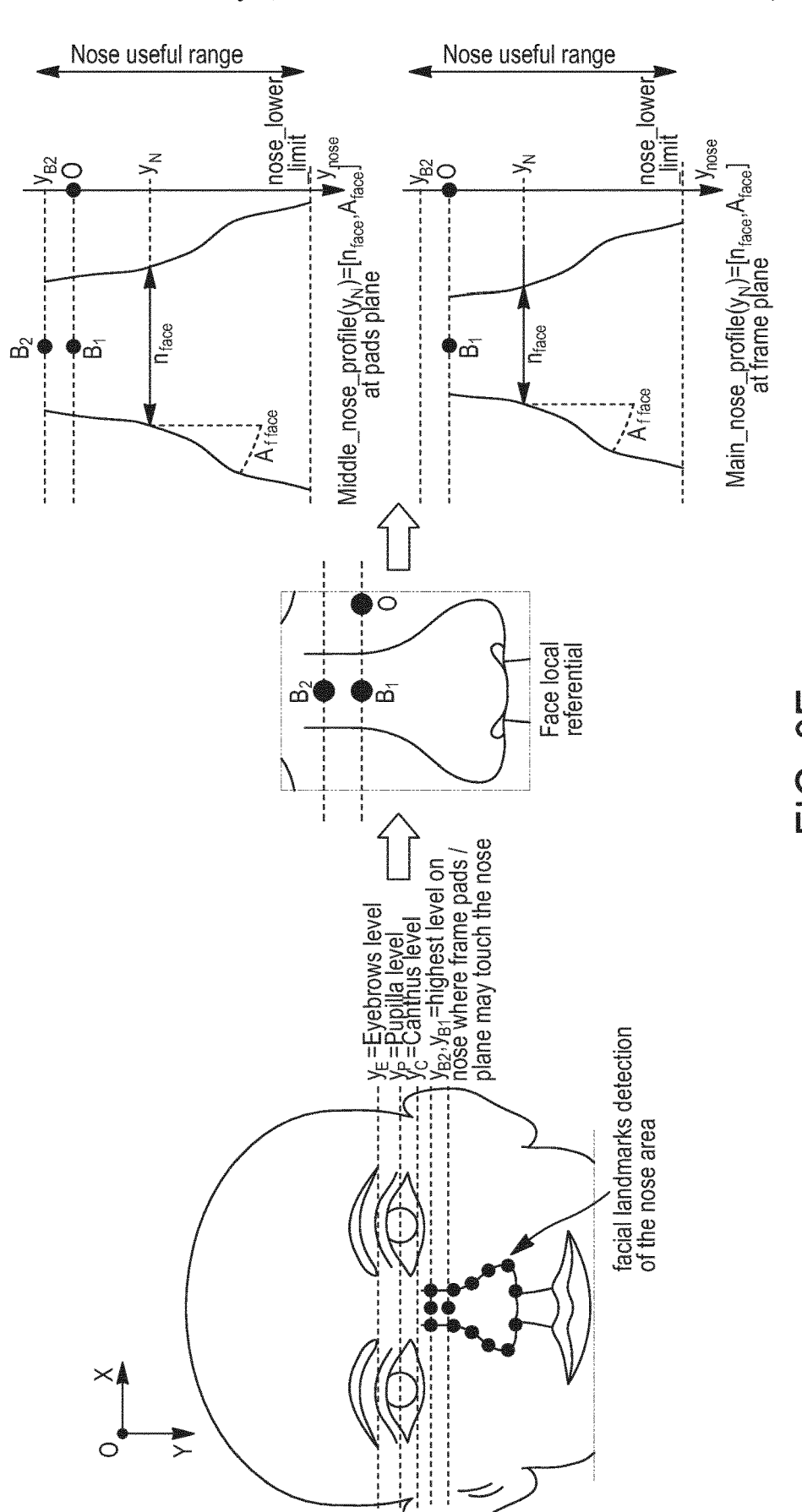
FIG. 3E is an illustration of a step of a sub process of a method of determining a fit of a visual equipment, according to an exemplary embodiment of the present disclosure.
Figures 4A, 4B:
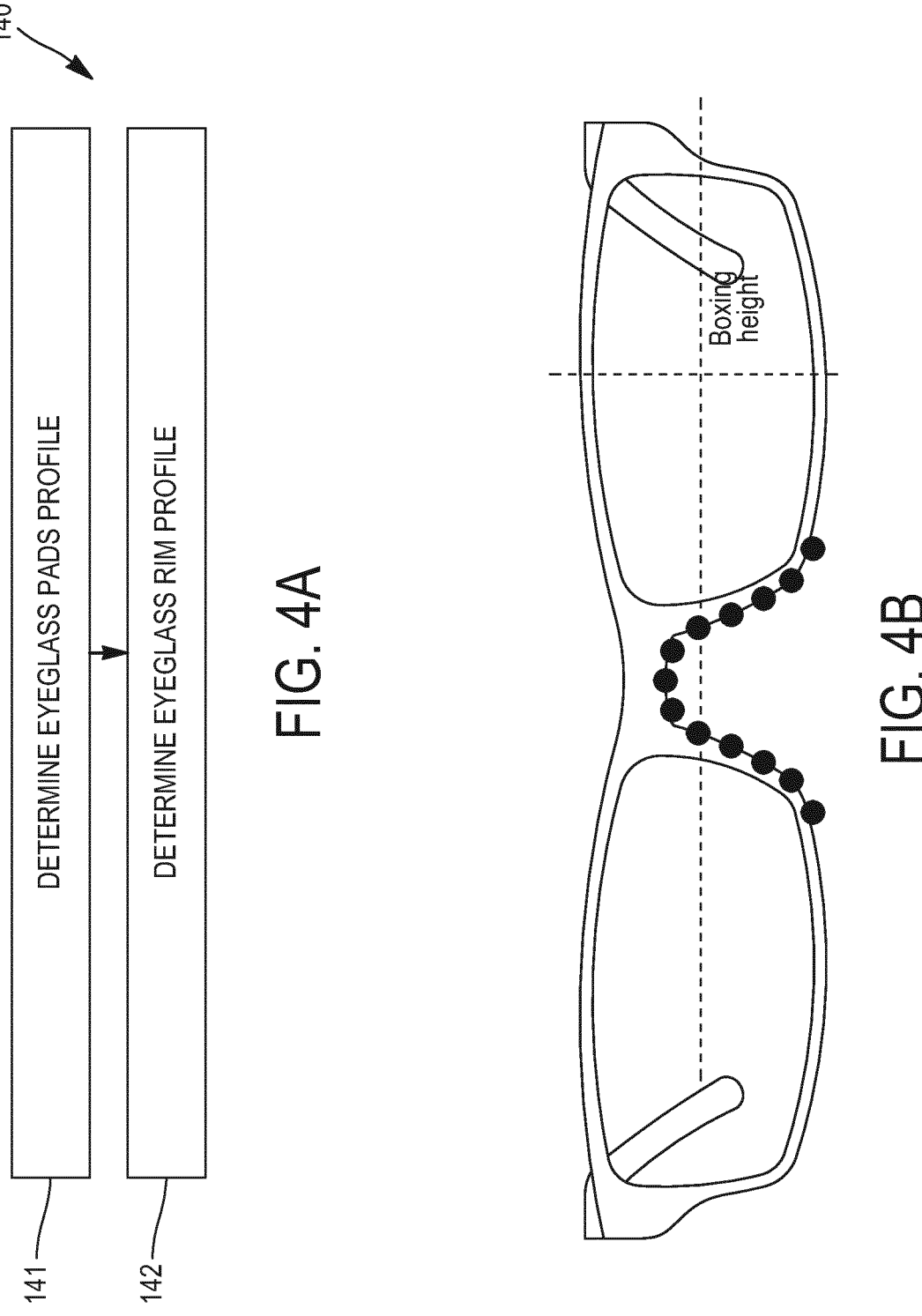
FIG. 4A is a flow diagram of a sub process of a method of determining a fit of a visual equipment, according to an exemplary embodiment of the present disclosure.
FIG. 4B is an illustration of a step of a sub process of a method of determining a fit of a visual equipment, according to an exemplary embodiment of the present disclosure.
Figure 4D:
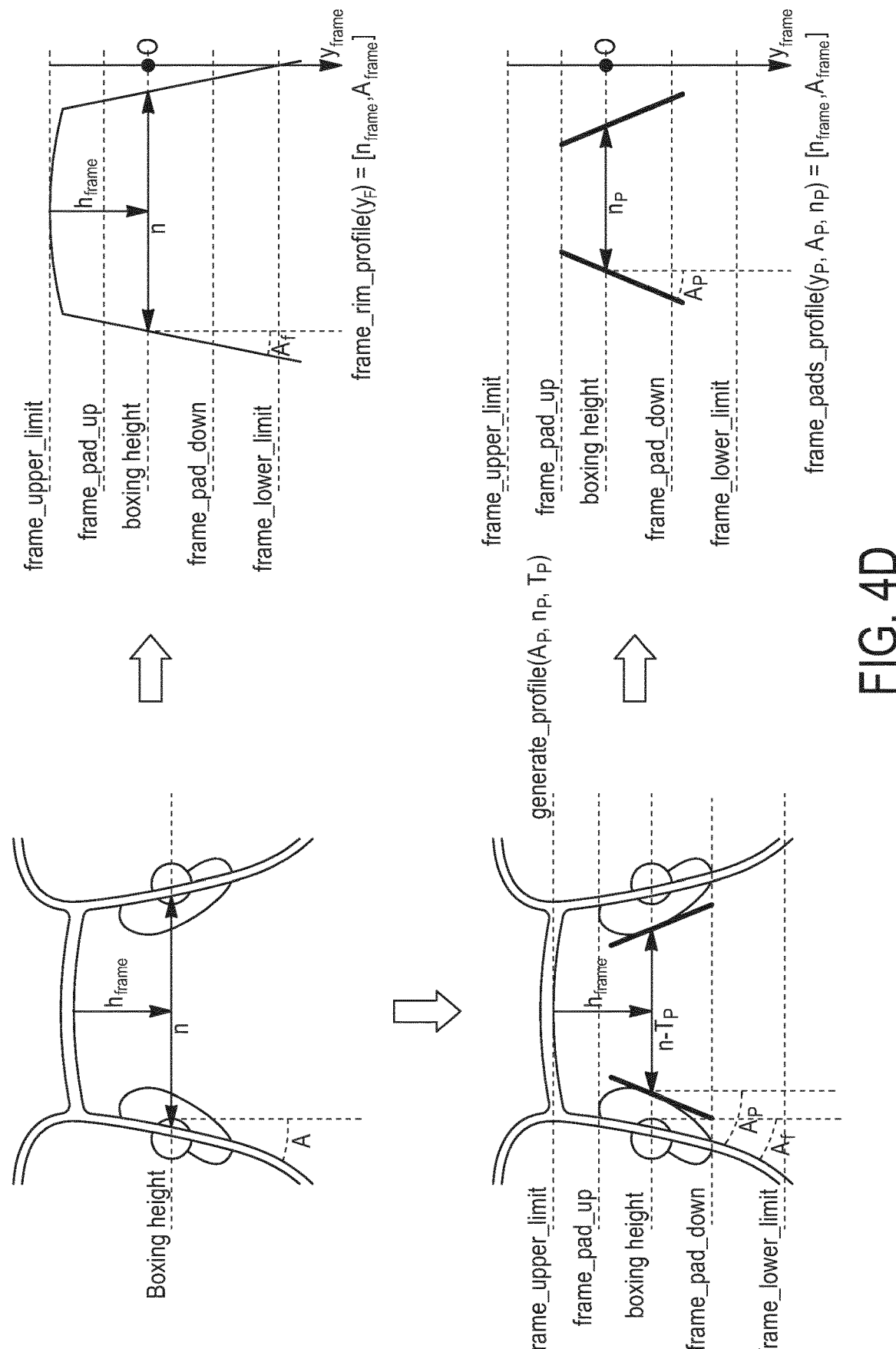
FIG. 4D is an illustration of a step of a sub process of a method of determining a fit of a visual equipment, according to an exemplary embodiment of the present disclosure.

Subsequently, main_nose_profile is limited to the range [$Y_{B1}$, nose_lower_limit]. In generating both of the middle_nose_profile and the main_nose_profile, as shown in FIG. 3D, the function splay($y_N$) can be determined by using statistics related to standard nose splay angles. An overview of the above-described generation of the at least one 2D profile of the nose of the face of the user, based on at least a 2D image of the face of the user, is illustrated in FIG. 3E.

In another embodiment, wherein the image(s) of the user includes a 3D image dataset of the face of the user, a 3D model of a nose contour of the nose of the user can be extracted from the 3D image dataset and can be used to deduce the at least one 2D profile of the nose of the user as intersections between the 3D model of the nose contour, or nose contour, and the eyeglass rim plane and the eyeglass pads plane determined at step 120 of method 105 and step 125 of method 105, respectively.

In another embodiment, wherein the image(s) of the user do not include a 3D image dataset of the face of the user, the 3D model of the nose contour of the nose of the user can be generated from a 2D dataset including image(s) and video(s) acquired via smartphone (e.g., pictures, videos). Such 3D model generation methods can be performed by 2D photogrammetry associated or not associated with simultaneous localization and mapping, structure of motion, deep learning, and the like. The acquisition of the 2D dataset can be performed by the user or by another person and can be reduced in size depending on the 3D reconstruction method employed. For instance, a single image may be used instead of several images.

In an example, wherein the image(s) of the user include a 2D dataset instead of a 3D image dataset of the face of the user, facial landmarks from 2D image(s) of the face of the user can be matched with a 3D nose pattern, assuming that a collection of representative 3D nose pattern models, including nose patterns from different morphotypes, is available. To this end, a B-spline may be used to interpolate facial landmarks from the 2D images within the 3D nose pattern.

In another example, when the image(s) of the user include a 2D dataset of the user instead of a 3D image dataset of the face of the user, a 3D model of the nose of the user can be generated from, as a first approximation, 2D images of the user acquired from a front view and from a profile view. The front view provides left and right edges of the nose in the (x, y) plane. The profile view provides a middle line of the nose in the (y, z) plane, which belongs to the vertical plane passing through the middle of the nose. From this, an approximate model of the nose can be constructed, and a cross-sectional shape of the nose can be deduced therefrom.

Returning now to FIG. 1, method 105 proceeds to sub process 140, wherein at least one 2D profile of the nasal section of the eyeglass rim of the candidate eyeglass is generated. The at least one 2D profile of the nasal section of the eyeglass rim of the candidate eyeglass are generated similarly to the 2D profiles of the nose of the user.

Sub process 140 of method 105 is described in greater detail with reference to FIG. 4A through FIG. 4D. With regard to FIG. 4A, the objective is to generate at least one 2D profile of the nasal section of the eyeglass rim of the candidate eyeglass. A first one of the at least one 2D profile of the nasal section of the eyeglass rim be an eyeglass pads profile determined at step 141 of sub process 140. Mathematically, the eyeglass pads profile may be described as eyeglass_pads_profile($y_F$)→($n_{yF}$, $A_{fyF}$) for any $y_F∈$[0; eyeglass_pad_up; eyeglass_pad_down]. A second one of the at least one 2D profile of the nasal section of the eyeglass rim may be an eyeglass rim profile determined at step 142 of sub process 140. Mathematically, the eyeglass rim profile may be described as eyeglass_rim_profile($y_F$)→($n_{yF}$, $A_{fyF}$) for any $y_F∈$[0; rim_upper_limit; rim_lower_limit]. $n_{yF}$ and $A_{fyF}$ reflect a nasal width and a facial angle, respectively, at $y_F$ level of a nose key profile of the eyeglass. The nose key profile of the eyeglass rim is reflected in FIG. 4B by dots lining an internal service of a nasal region of the eyeglass rim.

In order to determine the eyeglass pads profile and the eyeglass rims profile, two approaches may be considered, depending on the mobility of the eyeglass pads.

In an embodiment, for eyeglasses that have static pads (e.g. plastic eyeglass rims), positional features of the eyeglass pads (i.e., top of eyeglass pad, bottom of eyeglass pad) can be detected from the received image(s) or can be determined, statistically, from standard positions of the pads. For instance, standard positions may dictate that a top of an eyeglass pad is located at a distance of X mm above a boxing height (see FIG. 4B) and that a bottom of the eyeglass pad is located at a distance of Y mm below the boxing height. As it relates to the above-described equations of the at least one 2D profile of the nasal section of the eyeglass rim, rim_pad_up is a position at the top of an eyeglass pad and rim_pad_bottom is a position at the bottom of the eyeglass pad.

In the event the candidate eyeglass has static pads, a discontinuous and static profile for the eyeglass pads profile can be calculated by extracting the eyeglass rim profile. For instance, the area defined by the eyeglass pads, or [rim_pad_up, rim_pad_bottom], can be isolated by eyeglass_pads_profile($y_F$)→($n_{yF}$, $A_{fyF}$) for $y_{rim}∈$[eyeglass_pad_up, eyeglass_pad_bottom]. The eyeglass rim profile can then be calculated as a continuous and static profile by eyeglass_rim_profile($y_F$)→($n_{yF}$, $A_{fyF}$) for $y_{rim}$ C [rim_upper_limit, rim_lower_limit].

The above-described approach for static pads is illustrated in FIG. 4C. In lieu of the above, the at least one 2D profile of the eyeglasses may be provided by the eyeglass designer/manufacturer.

In an embodiment, for eyeglasses that have mobile pads, or rotating pads (e.g. certain metal eyeglass rims), positional features of the eyeglass pads (i.e., top of eyeglass pad, bottom of eyeglass pad) can be detected from the received image(s) or can be determined, statistically, from standard positions of the pads. For instance, standard positions may dictate that a top of an eyeglass pad is located at a distance of X mm above a boxing height (see FIG. 4B) and that a bottom of the eyeglass pad is located at a distance of Y mm below the boxing height. As it relates to the above-described equations of the at least one 2D profile of the nasal section of the eyeglass rim, rim_pad_up is a position at the top of an eyeglass pad and rim_pad_bottom is a position at the bottom of the eyeglass pad.

In the event the candidate eyeglass has rotating pads, a continuous and static profile for the eyeglass rim profile can be determined as eyeglass_rim_profile($y_F$)→($n_{yF}$, $A_{fyF}$) for $y_{rim}∈$[rim_upper_limit, rim_lower_limit]. Next, a discontinuous and parametric profile simulating the eyeglass pads flexibility can be determined as eyeglass_pads_profile($y_F$, $A_p$, $n_p$)$\rightarrow$($n_{yF}$, $A_{fyF}$) for $y_F \in$[eyeglass_pad_up, eyeglass_pad_down], where $n_p$ is a distance between the eyeglass pads and $A_P$ is an angle of the eyeglass pads, assuming that each one of the two eyeglass pads have the same facial angle.

Thus, in the scenario of rotating pads, it is assumed that the position of the rotation axis of the eyeglass pads is known, the amplitude of possible rotations is known, the attachment point of the eyeglass pad relative to the rotation axis is known, and the length of the eyeglass pads is known. From this, a parametric model can be created using different rotation angles for the pads (same for both eyeglass pads) and different distances between the attachment point of each eyeglass pad (adjusted by slightly bending a metal rod supporting the eyeglass pad), the parametric model generated different eyeglass pads profiles.

The above-noted 'limits' of the at the least two 2D profiles of the nasal section of the eyeglass are described below. For eyeglass rim profiles, a rim_lower_limit is a height for which the eyeglass nose key curvature (e.g. $A_{f\ rim}$) begins to exceed a certain limit (e.g. $A_{f\ rim\ limit}$=30° and a rim_upper_limit is a height of the eyeglass rim bridge. For instance, if the bridge is thick, the 'upper limit' may be equal to the height of the 'lower limit'. For eyeglass pads profile, eyeglass_pad_up is a height of the 'upper limit' of the eyeglass pad, while eyeglass_pad_down is the height of the 'lower limit' of the eyeglass pad.

Returning now to FIG. 1, and having generated the at least one 2D profile of the nose of the user and the at least one 2D profile of the nasal section of the candidate eyeglass, the candidate eyeglass may be virtually docked on the nose of the user at sub process 150 of method 105.

Figure 5A:
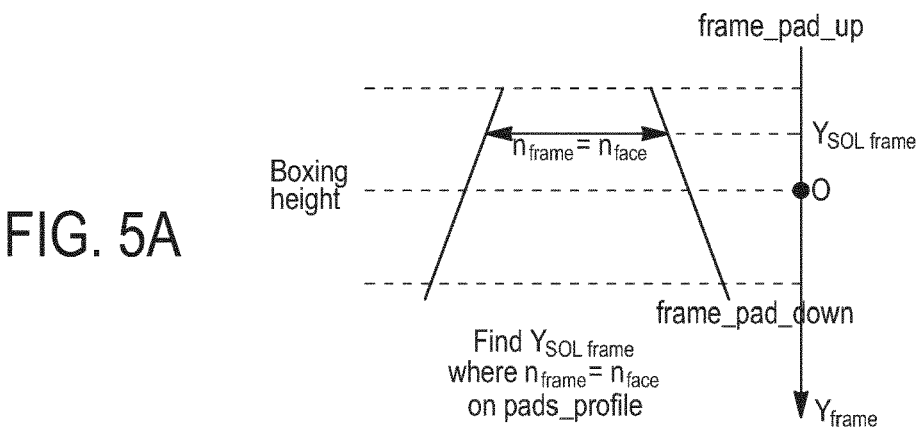
FIG. 5A is an illustration of a step of a sub process of a method of determining a fit of a visual equipment, according to an exemplary embodiment of the present disclosure.
Figure 5B:
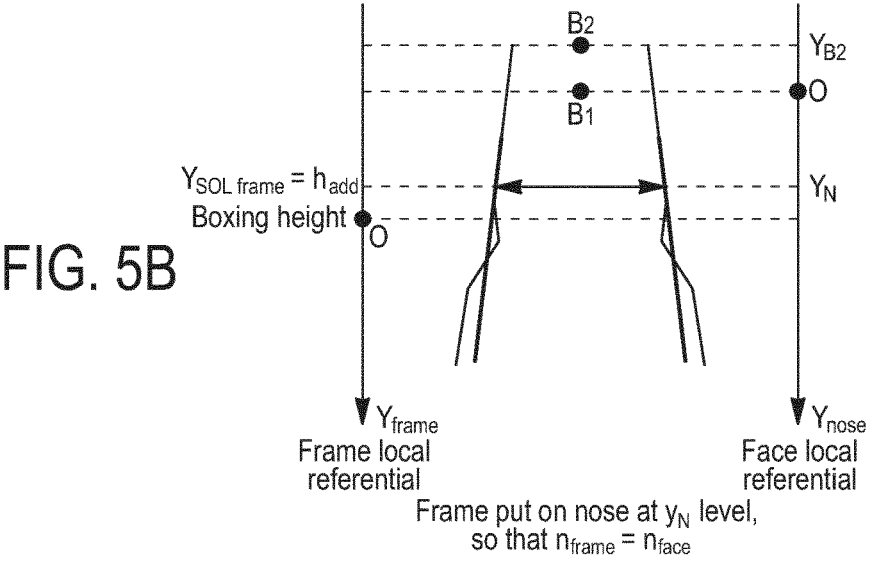
FIG. 5B is an illustration of a step of a sub process of a method of determining a fit of a visual equipment, according to an exemplary embodiment of the present disclosure.
Figure 5C:
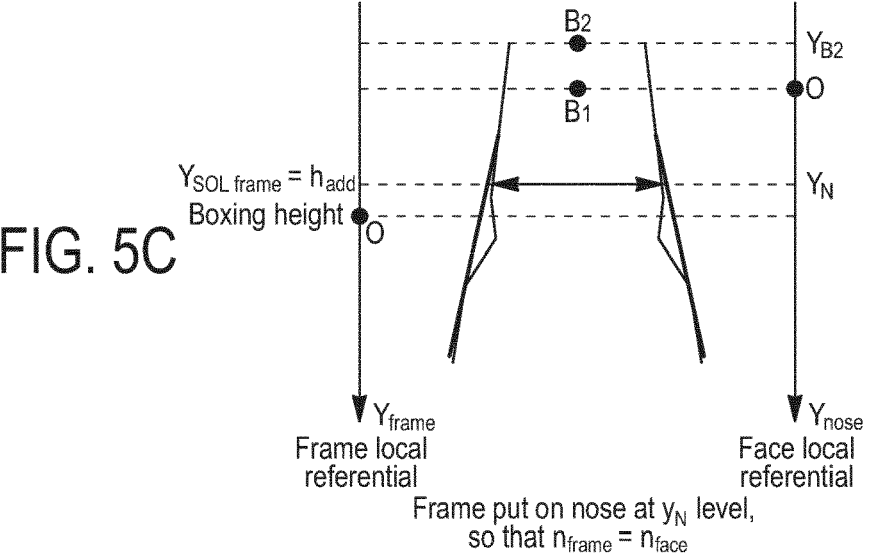
FIG. 5C is an illustration of a step of a sub process of a method of determining a fit of a visual equipment, according to an exemplary embodiment of the present disclosure.
Figures 5D, 5E, 5F, 5G, 5H:
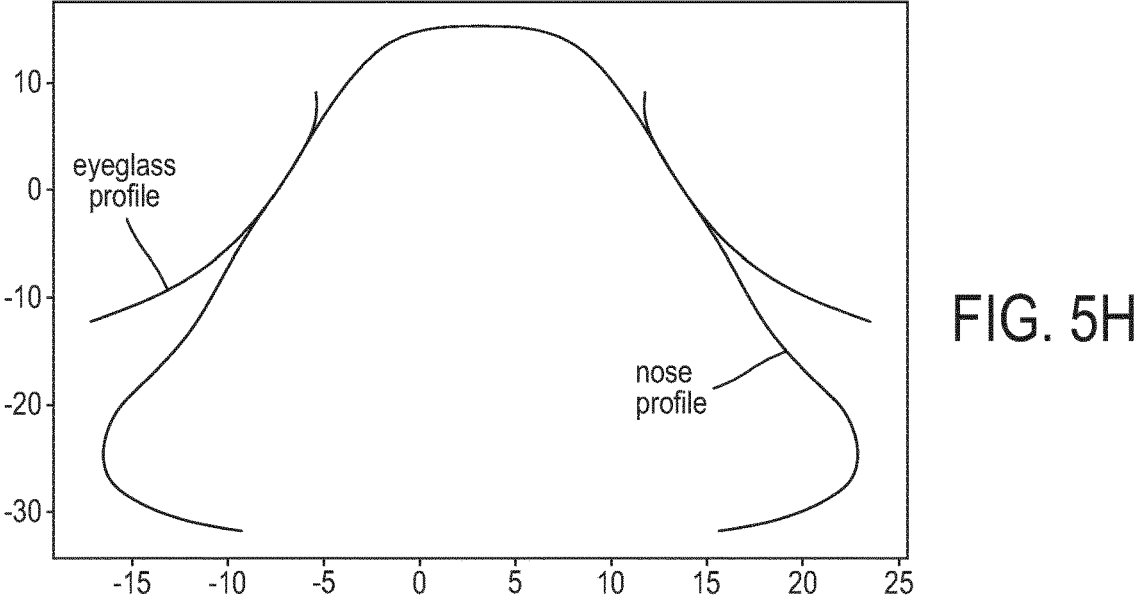
FIG. 5D is an illustration of a step of a sub process of a method of determining a fit of a visual equipment, according to an exemplary embodiment of the present disclosure.
FIG. 5E is an illustration of a step of a sub process of a method of determining a fit of a visual equipment, according to an exemplary embodiment of the present disclosure.
FIG. 5F is an illustration of a step of a sub process of a method of determining a fit of a visual equipment, according to an exemplary embodiment of the present disclosure.
FIG. 5G is an illustration of a step of a sub process of a method of determining a fit of a visual equipment, according to an exemplary embodiment of the present disclosure.
FIG. 5H is an illustration of a step of a sub process of a method of determining a fit of a visual equipment, according to an exemplary embodiment of the present disclosure.
Figure 5I:
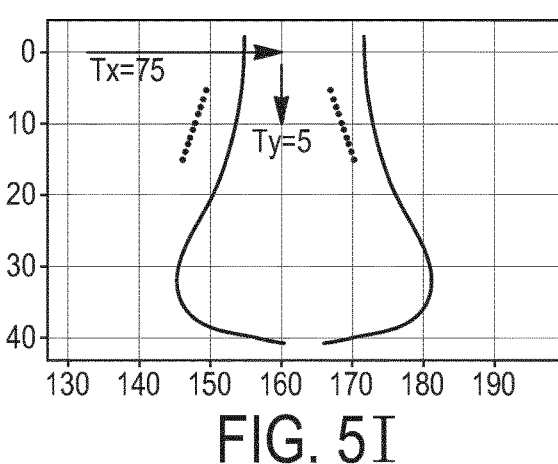
FIG. 5I is an illustration of a step of a sub process of a method of determining a fit of a visual equipment, according to an exemplary embodiment of the present disclosure.
Figure 5J:
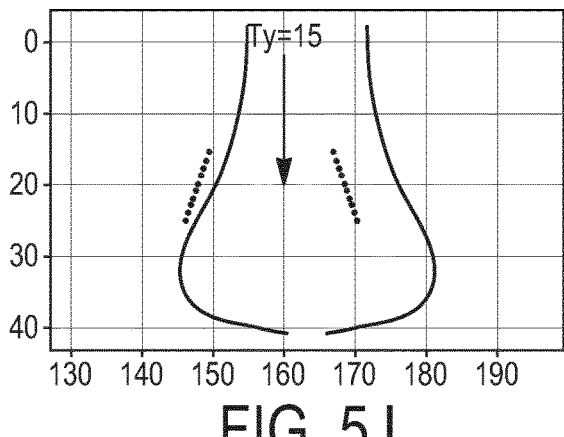
FIG. 5J is an illustration of a step of a sub process of a method of determining a fit of a visual equipment, according to an exemplary embodiment of the present disclosure.
Figure 5K:
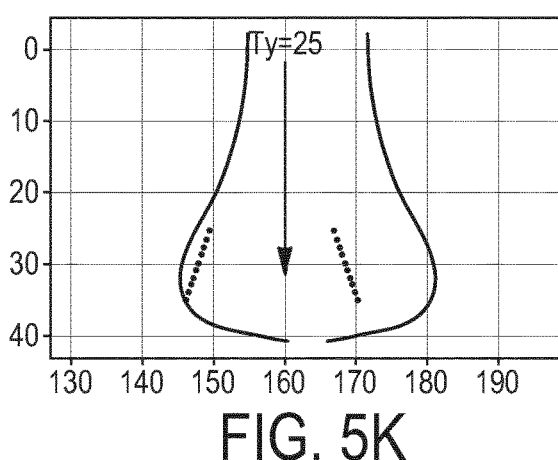
FIG. 5K is an illustration of a step of a sub process of a method of determining a fit of a visual equipment, according to an exemplary embodiment of the present disclosure.
Figure 5L:
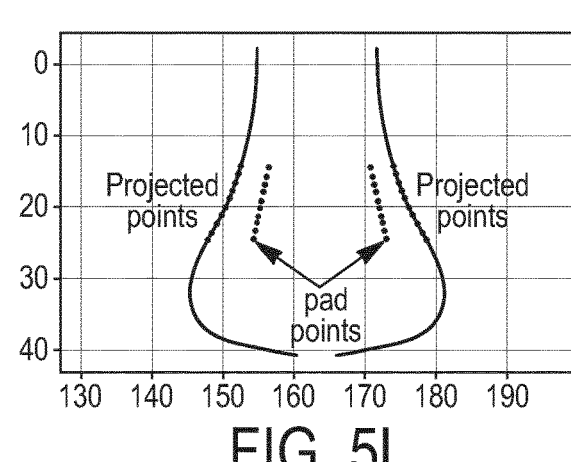
FIG. 5L is an illustration of a step of a sub process of a method of determining a fit of a visual equipment, according to an exemplary embodiment of the present disclosure.
Figure 5M:
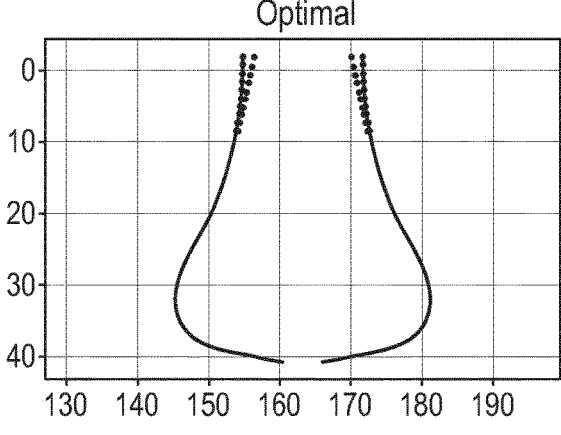
FIG. 5M is an illustration of a step of a sub process of a method of determining a fit of a visual equipment, according to an exemplary embodiment of the present disclosure.
Figure 5N:
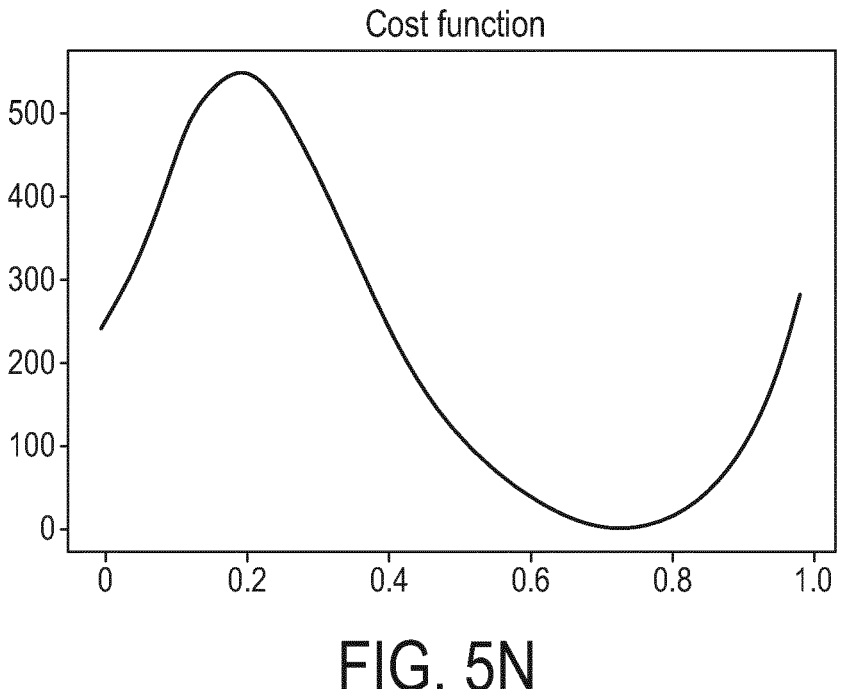
FIG. 5N is an illustration of a step of a sub process of a method of determining a fit of a visual equipment, according to an exemplary embodiment of the present disclosure.
Figure 5O:
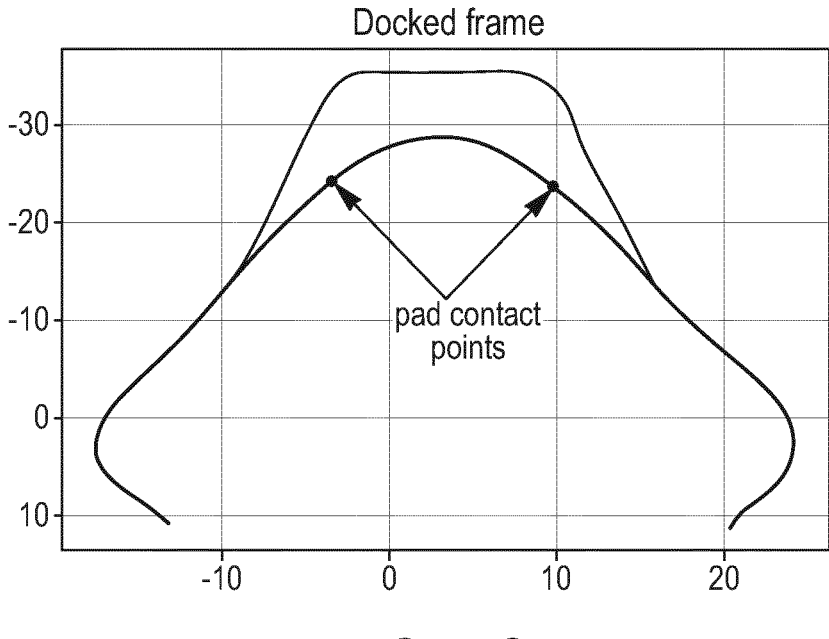
FIG. 5O is an illustration of a step of a sub process of a method of determining a fit of a visual equipment, according to an exemplary embodiment of the present disclosure.

Sub process 150 of method 105 is described in greater detail with reference to FIG. 5A through FIG. 5O. Sub process 150 may include different steps based on the type of eyeglass pads being used. For instance, an eyeglass having static pads may be treated differently than an eyeglass having parametric, or rotating (or mobile), pads. Further still, each type of eyeglass pad may be processed in different ways to virtually dock the eyeglass upon the nose of the user With regard to FIG. 5A through FIG. 5C, a first approach for static eyeglass pads can be implemented. In an embodiment, the first approach for static eyeglass pads may include a first step of docking the eyeglass pads upon the nose (thus in the eyeglass pads plane) and a second step of confirming the eyeglass rim profile does not intersect the nose (thus in the eyeglass rim plane). The first step is performed in order to prioritize contact between the nose of the user and the eyeglass pads of the eyeglass. To this end, middle_nose_profile and eyeglass_pads_profile may be used. The second step is performed in order to confirm the eyeglass position on the nose is feasible. To this end, main_nose_profile and eyeglass_rim_profile may be used.

The first step can include, starting from facial landmark B2 (discussed previously), browsing the middle_nose_profile with a predetermined step size (e.g. step=0.1 mm). At a given level $y_N$, the eyeglass pads may be placed upon middle_nose_profile (i.e. find the exact level where nose profile will touch the frame) and viability of the position may be confirmed. In other words, as illustrated in FIG. 5A, the first step may proceed as follows: (1) compute the nasal width ($n_{face}$) and the facial width ($A_{face}$) at $y_N$ level, (2) find the eyeglass pads level $Y_{SOL\ eyeglass}$ where $n_{eyeglass}$=$n_{face}$, and (3) check that $Y_{SOL\ eyeglass}$ is within the rim_pads_useful_range (i.e. rim_pad_up−rim_pad_down]). If the current docking positioning at $y_N$ is acceptable, or 'OK', as illustrated in FIG. 5B and FIG. 5C, then the sub process proceeds to the second step.

The second step can include checking whether the eyeglass rim profile intersects the nose (in the eyeglass rim plane) for the current docking position. To this end, frame_rim_profile($y_F$) can be browsed between the range [rim_upper_limit, rim_lower_limit] for a given $y_F$. The browsing results in determining which $y_{nose}$ corresponds to $y_F$ within the nose profile referential. Thus, it can then be confirmed that the nasal width of eyeglass_rim_profile($y_F$) is greater or equal to the nasal width of main_nose_profile($y_{nose}$).

In the event the second step determines the current docking position to be viable, then nose browsing can be halted and the following can be recorded in a database: (1) corresponding ordinate $y_N$ of the nose (in the nose referential), (2) corresponding ordinate $y_{SOL\ eyeglass}$ of the eyeglass (in the eyeglass referential). The recorded coordinates allow for computing comfort criteria for the eyeglass positioning during sub process 170 of method 105. Of course, it can be appreciated that if the nose browsing described above ends without finding a viable docking position, the eyeglass frame can be eliminated.

Further to the above, a second approach for static eyeglass pads can be implemented.

In an embodiment, the second approach for static eyeglass pads may include, from the frame profile points, calculating a smooth model. In an example, the smooth model may be a B-spline model, as shown in FIG. 5D and FIG. 5E. The smooth model aids in accounting for symmetry and reducing noise. In an embodiment, the smooth model can be defined as spEyeglass(u)=($x_F$(u), $y_F$(u)), $u \in$[0,1]. In an example, these points can be limited to the contact zone. For instance, for eyeglass rim profiles, the range can be limited to between rim_upper_limit and rim_lower_limit, while the range can be limited to between rim_pad_up and rim_pad_down for eyeglass pad profiles.

In an embodiment, the second approach for static eyeglass pads may include, from the nose profile points, calculating a smooth model. As the nose profiles feature discontinuous profiles, as shown in FIG. 5F, two smooth models can be generated, as shown in FIG. 5G. One for the right eye side, or spNoseRightEye, and one for the left eye side, or spNoseLeftEye. In an example, spNoseRE(u)=($x_{N,RE}$ (u), $y_{N,RE}$ (U)) $u \in$[0,1] and spNoseLE(u)=($x_{N,LE}$ (u), $y_{N,LE}$(u)), $u \in$[0, 1].

For both of the frame profile and the nose profiles, two criteria can be calculated. First, for a given parameter $u \in$[0,1], a width of the nose and eyeglass can be defined as $w_N$(u) and $w_F$(u), respectively. A tangent angle for the nose profiles can be defined as $\theta_N$(u) and $\theta'_N$(u) for the right eye side and the left eye side, respectively, and a tangent angle for the eyeglass profile can be defined as $\theta_F$(u) and $\theta'_F$(u) for the right eye side and the left eye side, respectively.

To be more precise, for a given $u \in$[0,0.5], $u' \in$[0.5,1] can be calculated such that $y_F$(u')=$y_F$(u). Thus, $w_F$(u)=$y_F$(u')−$y_F$(u). And for $u \in$[0,1], $u' \in$[0,1] can be calculated such that $y_N$(u')=$y_N$(u). Thus, $w_N$(u)=$y_N$(u')−$y_N$(u).

In view of the above, docking can be calculated by searching the contact points (on the nose and on the eyeglass) where the same width and the same tangent angles are present. This can be done by solving an optimization problem defined by a cost function. In an example, the cost function may be $j(u_0, u_1)=\omega_1(w_F(u_1)-w_N(u_0))^2+\omega_2(\theta_F(u_1)-\theta_N(u_0))^2+\omega_3(\theta'_F(u_1)-\theta'_N(u_0))^2$, where $u_0$ is the parameter that defines the contact point on the nose and $u_1$ is the parameter that defines the contact point on the eyeglass, the cost function being evaluated for a give $u_0 \in [0,1]$ and $u_1 \in [0,0.5]$. As described herein, the cost function is a classical function for solving a least-squares problem, but can be any other readily applicable and relevant cost function. As noted above, and as shown in FIG. 5H, the solution is the position having the same width and the same tangent angle at the contact points between the eyeglass profile and the nose profile.

Further to the above, a third approach for static eyeglass pads can be implemented.

In an embodiment, the third approach for static eyeglass pads may include optimizing a position of the eyeglass with two translations. In an example, translations may be in the x-direction and in the y-direction, as shown in FIG. 5I through FIG. 5K. The distance of the translations can be determined by a cost function such that points of the eyeglass pads profiles are projected onto the nose profile in order to calculate the distance between the eyeglass pads and the nose, as shown in FIG. 5L and FIG. 5M.

As introduced above, sub process 150 of method 105 may also proceed in considering an eyeglass having parametric, or rotating (or mobile), pads. For parametric pads, three different approaches can be implemented for determining a location of an eyeglass, and eyeglass pads thereon, on the nose of the user.

In an embodiment, a first approach includes generating a "eyeglass pads profile" candidate, or rim_pads_profile($A_P$, $n_p$, $y_F$), for each couple of parametric values ($n_p$, $A_p$) that can vary within a given range of parametric values. Thus, for each "eyeglass pads profile" candidate, the corresponding eyeglass (current rim_pads_profile candidate+eyeglass_ rim_profile, which is common to every rim_pads_profile candidate) can be docked upon the nose of the user, as described previously with regard to the first approach for static eyeglass pads, and comfort level can be evaluated according to methods described herein. Based on the dockings, a parametric couple ($n_p$, $A_p$), and consequently the "eyeglass nose key profile" candidate and the associated frame positioning upon the nose) that corresponds to a maximum comfort level, can be selected.

In an embodiment, a second approach includes adapting eyeglass pads to the nose profile. To this end, the angle A_F can be adapted to the nose profile for each accessible pads width. So the process is adapted, considering the contact point on the eyeglass is given by the center point of the pads. In this way, only the contact point on the nose is sought.

For each given pads width ($w_F$), the docking solution can be defined where the nose has the same width. Thus, given a spline nose model, the nose width ($w_N(u)$) for each $u \in [0,1]$ can be calculated, and the docking solution can be calculated using the following cost function: $j(u)=(w_N(u)-w_F)^2$. For example, for a given width $w_F=n-5$, the cost function and solution can be modeled as illustrated in FIG. 5N and FIG. 5O.

In an embodiment, a third approach includes exploiting information related to the eyeglass pads. In the case of parametric pads, the position of the eyeglass may include two translations and an orientation of the eyeglass pads with a rotation angle. The position of the eyeglass may be determined by an optimization that generates a modification of the translation ($T_x$, $T_y$) and a modification of the eyeglass pad angle ($A_p$). In an example, the optimization may be performed in view of a cost function wherein points of the eyeglass pad profiles are projected on the nose profile in order to calculate a distance between the eyeglass pad and the nose. A similar approach was followed in the third approach of the static eyeglass pads.

Returning now to FIG. 1, and having virtually docked the candidate eyeglass on the nose of the user, method 105 proceeds to step 160, wherein global reference positions of the eyeglass and the face of the user are compared. The comparison at step 160 of method 105 is a secondary filtering step wherein eyeglasses may be eliminated as options based on comparisons between high-level dimensional features.

For instance, with the eyeglass rim plane placed upon the nose, and thus $Y_{SOL\ eyeglass}$ is known, the whole frame (i.e. the eyeglass rim plane along with the temples) can be considered in order to assess certain dimensionally-driven comfort aspects of the candidate eyeglass. The dimensionally-driven comfort aspects of the candidate eyeglass include matching of the temples length, horizontality of the temples, and the like.

Figure 6A:
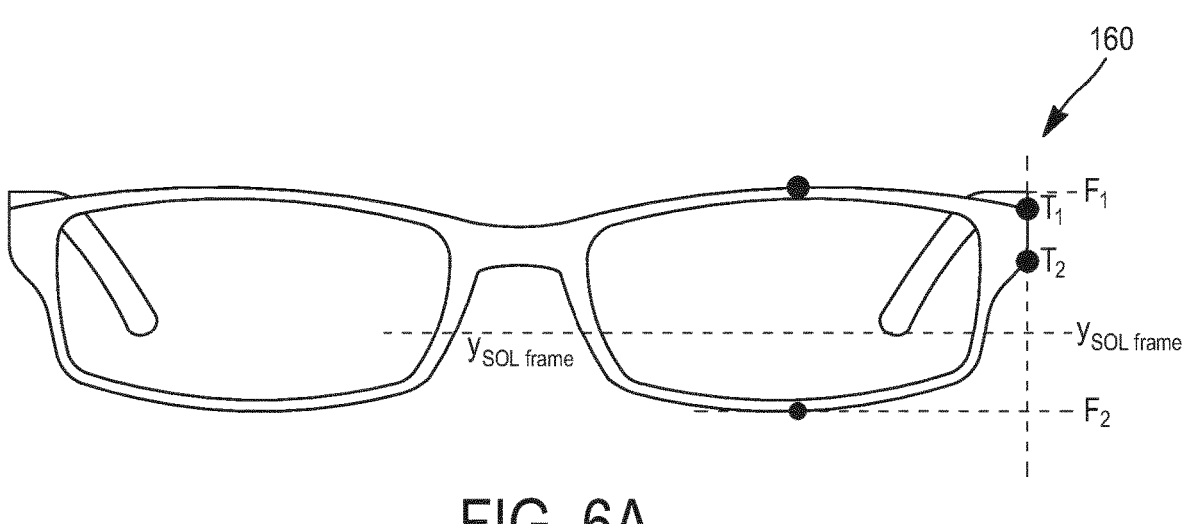
FIG. 6A is an illustration of a step of a method of determining a fit of a visual equipment, according to an exemplary embodiment of the present disclosure.

To this end, the position of the features of the candidate eyeglass, or temples of the candidate eyeglass (higher limit $T_1$, lower limit $T_2$), in an example, may be measured as shown in FIG. 6A or retrieved from a 3D frame design database. If not available, the position of the temples of the candidate eyeglass may be estimated based on the type of eyeglass rim, material type of eyeglass rim, and the like.

Figure 6B:
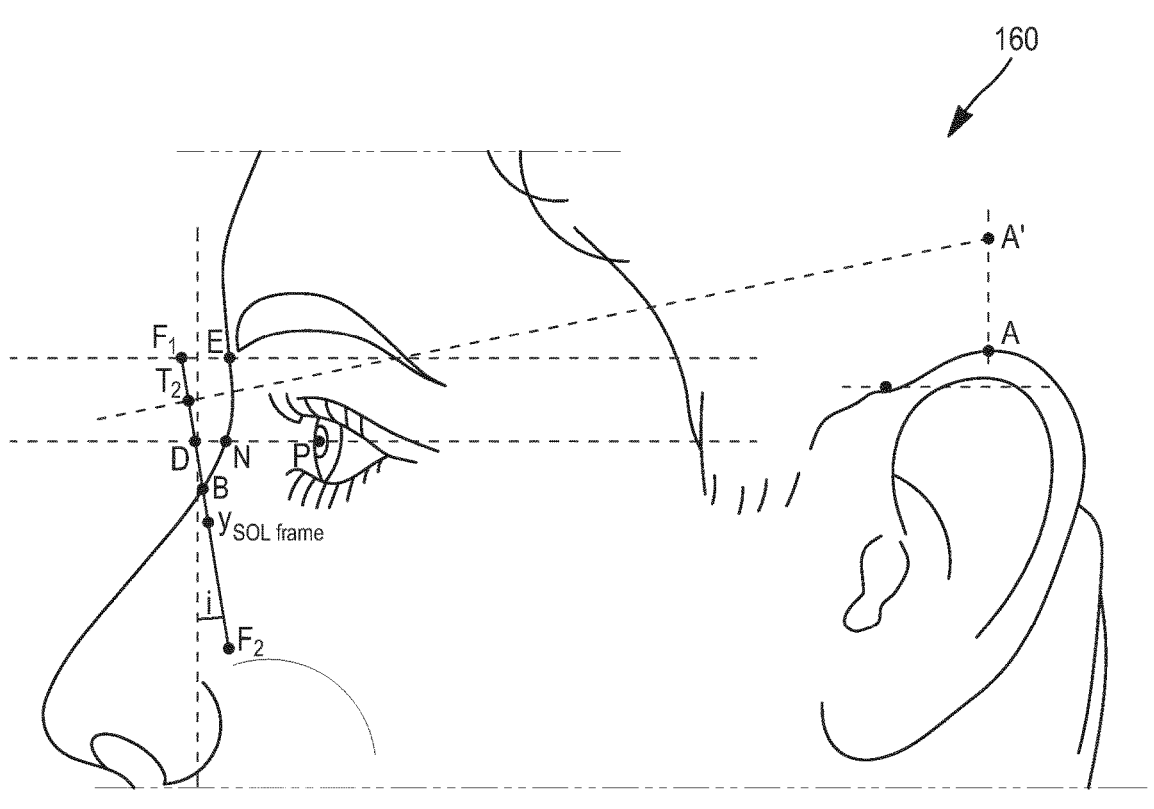
FIG. 6B is an illustration of a step of a method of determining a fit of a visual equipment, according to an exemplary embodiment of the present disclosure.

With $T_1$ and $T_2$ identified, the eyeglass may be viewed from a profile view, as shown in FIG. 6B. This allows $F_1$, $T_2$, $Y_{SOL\ eyeglass}$, and $F_2$ points to be identified on the profile view. Accordingly, the intersection of the eyeglass temple with the vertical line can be detected as point A'. The eyeglass temple may be provided as an angle between the temple and the eyeglass rim plane, measured from a profile view of the eyeglass frame, or assumed to be 90°. Further, the contact point between the temple and the ear of the user can be detected as point A.

A comparison of a distance between point A and point A' may be evaluated relative to a predetermined threshold. In an example, the predetermined threshold may be a distance in cm. For instance, if $|AA'|>1$ cm, then the eyeglass can be eliminated. If $|AA'|<0.5$ cm, the eyeglass can be saved and a distance $AT_2$, which provides an ideal temple useful length, and a, which defines the angle between the temple and the horizontal plane, can be measured and then used to assess comfort of the eyeglass (e.g. comfort on ears). If 0.5 cm$<|AA'|<1$ cm, the eyeglass rim plane, and thus pantoscopic angle i, can be adjusted so that $|AA'|=0.5$ cm. Thus, the eyeglass positioning can be recomputed, as described in earlier sections of the present disclosure.

Figure 7A:
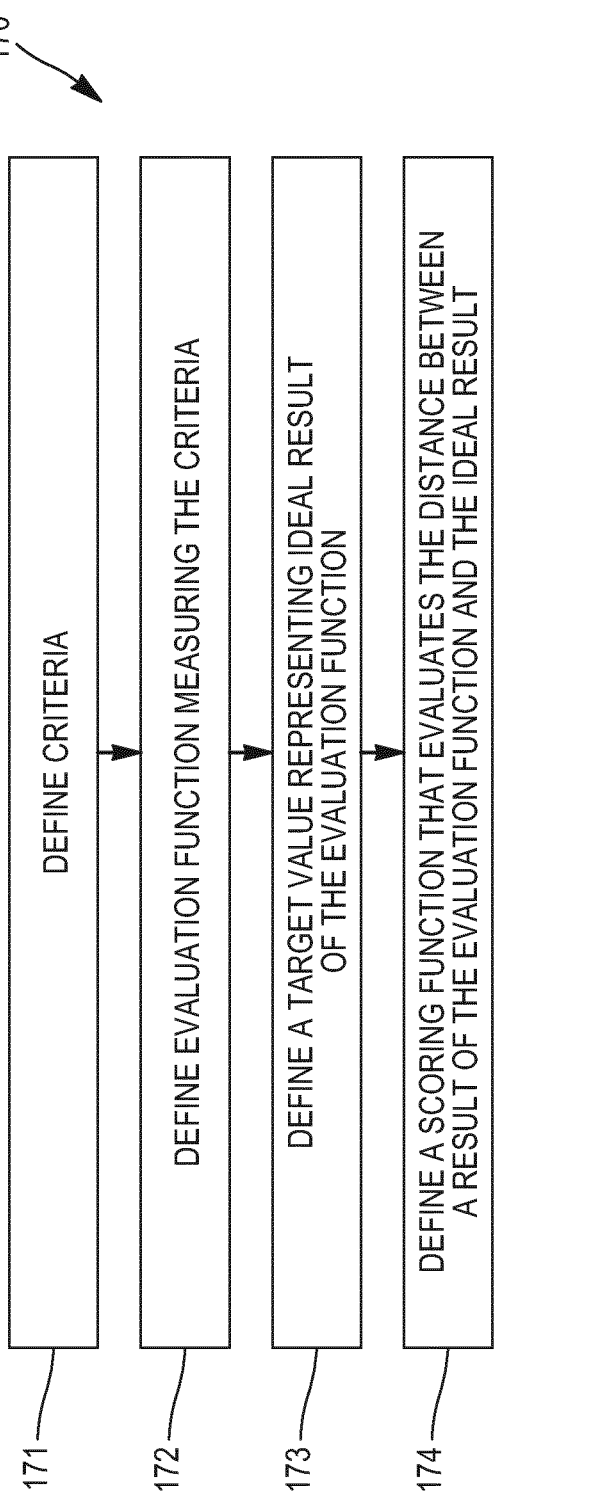
FIG. 7A is a flow diagram of a sub process of a method of determining a fit of a visual equipment, according to an exemplary embodiment of the present disclosure.
Figure 7B:
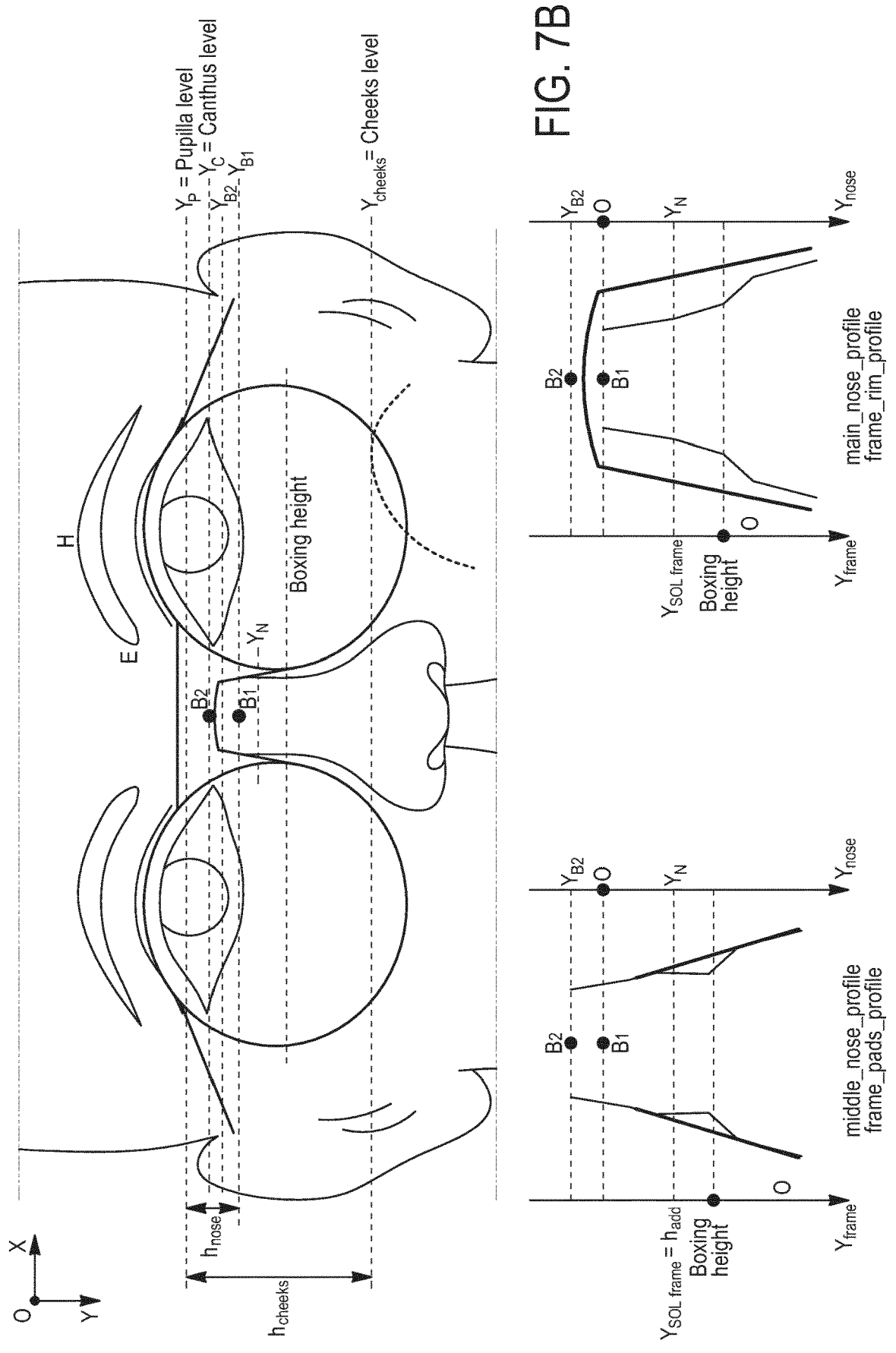
FIG. 7B is an illustration of a step of a sub process of a method of determining a fit of a visual equipment, according to an exemplary embodiment of the present disclosure.

Returning now to FIG. 1, and having determined the candidate eyeglass satisfies the global positioning criteria at step 160 of method 105, method 105 proceeds to sub process 170, wherein a final fit of the virtually docked candidate eyeglass is calculated. The final fit calculation at sub process 170 of method 105 may include, individually or in combination, an assessment of comfort, aesthetics, and the like, as will be described with reference to FIG. 7A and FIG. 7B. In an example, the final fit score may be a weighted average.

First, regarding comfort, several comfort criteria $C_i$ such as nose comfort, eye positioning within the lens, eyebrows comfort, cheeks comfort, temples comfort, ears comfort and the like, can be defined at step 171 of sub process 170. Further, each criterion CL can be formed by several sub-criteria $S_{ij}$. Thus, for each criterion (or sub-criterion), the following can be defined. At step 172 of sub process 170, an evaluation function $EF_{ij}$ measuring the criterion (or sub-criterion), wherein inputs include one or more morphological features ($x_1, \ldots, x_N$) of the face of the user, or of the eyeglass, can be defined. At step 173 of sub process 170, a target value $t_{ij}$ representing an ideal value can be defined. At step 174 of sub process 170, a scoring function $F_{ij}$ that evaluates a distance between a result of the evaluation function and the ideal result, or target value, can be defined. The distance can be an absolute value or a squared distance. The score of a given sub-criteria can be defined as $S_{ij}=F_{ij}$ $(EF_{ij}(x_1, \ldots, x_N), t_{ij})$. The score of a given criterion can then be determined as a linear combination of each sub-criteria score, or as $$C_i = \frac{\sum_j w_{ij} S_{ij}}{\sum_j w_{ij}}$$

It can be appreciated that $C_i$ is a weighted average of calculated values of each sub-criterion, $S_{ij}$, where $w_{ij}$ is a corresponding weight. Weights can be determined dynamically according to available training data, the training data being accumulated and versatile in order to distribute the algorithm to more people. Alternatively, weights can be assigned statically according to relative importance. For instance, a temples comfort sub-criterion may be more important to overall eyeglass comfort than a cheeks comfort sub-criterion, and thus respective weights should reflect this relative importance.

Moreover, the final fit score may be a combination of weighted criteria such that each comfort criteria $C_i$ (e.g. comfort, aesthetics, felt weight) can be given a weight in accordance with their relative contributions to the final fit score. For instance, comfort may be universally recognized as more important than aesthetics, however, a user may hold the opposite preference. As such, final fit scores can reflect this preference by assigning weights, accordingly. In an embodiment, a user may indicate comfort preferences in a user profile or during a real-time interaction with a service that offers personalized eyeglass recommendations.

The above will now be explained with reference to examples of criteria and sub-criteria.

A first example focuses on nose comfort (i.e. is the frame likely to pressure the nose or to slip?). The nose_comfort criterion is a combination of three sub-criteria. A first sub-criterion, $S_1$, is a height at which the eyeglass rim is positioned upon the nose. In other words, how far is the eyeglass "boxing height" from the point where the nose contacts the eyeglass pads profile (e.g. $Y_{SOL\ eyeglass}$). It can be appreciated that the higher the frame is positioned, the more the frame will pressure the nose. A second sub-criterion, $S_2$, represents matching near the contact point of: (1) rim_pads_profile and middle_nose_profile and (2) eyeglass_rim_profile and main_nose_profile. To assess this sub-criterion, the area of the space between the rim_pads_profile and the middle_nose_profile can be calculated and, similarly, the area of the space between the eyeglass_rim_profile and the main_nose_profile can be calculated, near the contact point. Each area can then be added together. The greater the area is, the more the frame will pressure the nose, and the more the frame may slip. A third sub-criterion, $S_3$, represents the positioning of the eyeglass bridge (i.e. highest point of the eyeglass rim profile) relative to the nose. In other words, how far is the eyeglass bridge from the nose summit (i.e. facial landmark point B1 described previously). To this end, the nose comfort criterion can be defined as a weighted sum of the above-described sub criterion, or $$C_{nose\_comfort} = (w_{rim\_height\_positioning\_on\_nose} * S_1 + w_{rim\_angle\_positioning\_on\_nose} * S_2 + w_{rim\_bridge\_positioning\_on\_nose} * S_3)/(w_{rim\_angle\_posi\text{-}}$$

$$tioning\_on\_nose + w_{rim\_height\_positioning\_on\_nose} + w_{rim\_bridge\_positioning\_on\_nose})$$

An example of a sub-criterion $S_2$ of the nose comfort criterion is described below. $S_2$ describes matching, near the contact point, of the rim_pads_profile and the middle_nose_profile. For both the left eye side and the right eye side, a distance between the pad and the nose near the contact point can be calculated. The pad (rim_pads_profile) can be discretized around the contact point in n points: $(x_i, y_i)$. Each point $p=(x_i, y_i)$ is projected on the nose using, for example, orthogonal projection:

$$p' = (x_i', y_i').$$

Then, for each point, a distance can be calculated as $$d_i = \|p_i - p_i'\|.$$

Knowing a threshold $\varepsilon$, the percentage of pad length that is close to the nose can then be calculated as: for $i=1, \ldots, N-1$, $h_i=\|p_i-p_{i+1}\|$, if $d_i<\varepsilon$. Otherwise, $h_i=0$. The length of the pad close to the nose can be given for each side (left eye side and right eye side) as:

$$L_\epsilon = \sum_{i=1}^{N-1} h_i.$$

The total length is L=

$$\sum_{i=1}^{N-1} \|p_i - p_{i+1}\|.$$

The criterion is then given by $$S_{21} = \frac{L_\epsilon}{L}$$

for one side and by $$S_{22} = \frac{L_\epsilon}{L},$$

wherein $S_2=\frac{1}{2}(S_{21}+S_{22})$.

In an embodiment, an example of sub-criterion $S_2$ of the nose_comfort criterion, is described below. $S_2$ is the matching, near the contact point, of the rim_pads_profile and the middle_nose_profile and of the rim_pads_profile and the main_nose_profile. If $[y_1, y_2]$ is a range on the nose from which the area can be computed, and A(X, Y) is the area of the figure delimited by X and Y lines, then the evaluation function can be defined as $EF_2=A(middle\_nose\_profile([y_1, y_2], rim\_pads\_profile([y_1, y_2]))+A(main\_nose\_profile([y_1, y_2], rim\_pads\_profile([y_1, y_2]))$ The target value may be set as 0 and the scoring function can be described by the following equations, assuming a best score value is 1: $F_2(X)=1$ if x=0 (i.e., the eyeglass and nose profiles perfectly fit to each other), $F_2(X)=(max\_area\_v\text{-}$ alue−x)/max_area_value if 0<x<max_area_value (i.e., the contact area may be uncomfortable, but it is not necessarily a pain point), and $F_2(X)=0$ if x>max_area_value (i.e. it is very probable that there is only one contact point, and the nose and eyeglass pads shapes are very different).

In an embodiment, an example of a criterion is eye position comfort and focuses on eye position within the lens, as described below. For instance, is the frame likely to be positioned to high, too low, too close to the nasal side, or too close to the temporal side, among others. The eye position within the lens s, or eye_position_within_lens can be a combination of two sub-criteria.

For instance, eye vertical positioning, or $S_1$, measures how far the eyeglass actual positioning is from the ideal positioning. The "ideal" positioning can be assumed to be when the frame boxing height is at the eye canthus level, the eye canthus level being the lowest of the four eye canthi. Further, a distance from VD ideal, or $S_2$ or distance_from_V-D_ideal, can be measured as a distance between the actual vertex distance of the face of the user and the $VD_{ideal}$, as described previously.

In an embodiment, an example of a criterion is eyebrows comfort and focuses on eyebrows comfort (i.e. is the frame likely to touch the eyebrow arch?). To this end, coordinates of the highest point of the frame $(X_F, Y_F)$ and the lowest point of the eyebrows $(X_E, Y_E)$ can be measured. A distance $D_{eb}=Y_F-Y_E$ can be defined, wherein a threshold for eyebrows, $(TH_{eb})$, is less than zero and a score is $C_{eb\_comfort}$. Accordingly, an evaluation of the candidate eyeglass may proceed as follows. If $D_{eb}<TH_{eb}$, the frame can be eliminated as $c_{eb\_comfort}=0$. If $TH_{eb}<D_{eb}<0$, then $c_{eb\_comfort}=(D_{eb}-TH_{eb})/|TH_{eb}|$. Of course, if $D_{eb}>0$, then $c_{eb\_comfort}=1$. In other words, the eyebrows comfort evaluates whether the frame of the eyeglasses is blocking the eyebrows and, if it is blocking the eyebrows, by how much. The relative position between the topmost point of the frame and eyebrows arches lowermost point can be compared for this evaluation.

In an embodiment, an example of a criterion is cheeks comfort and focuses on cheeks comfort (i.e. is it likely the eyeglass will touch the cheeks?). To this end, coordinates of the lowest point of the eyeglass $(X_F, Y_F)$ and the highest point of the cheek $X_C, Y_C)$ can be measured. A distance $D_{cheek}=Y_C-Y_F$, wherein a threshold for cheeks $(TH_{cheek})$ and a score $c_{cheek\_comfort}$ are described below. Accordingly, an evaluation of a candidate eyeglass may proceed as follows. If $D_{cheek}<-TH_{cheek}$, the candidate eyeglass can be eliminated as $c_{cheek\_comfort}=0$. If $-TH_{cheek}<D_{cheek}<TH_{cheek}$, then $c_{cheek\_comfort}=(TH_{cheek}-|D_{cheek}|)/TH_{cheek}$. If $D_{cheek}>TH_{cheek}$, then $c_{cheek\_comfort}=1$.

Additional comfort criterion that can be evaluated include temple comfort (i.e. is the eyeglass likely to pressure the temples?), ears comfort (i.e. is the eyeglass likely to pressure the ears and/or is the frame worn horizontally enough?), and the like.

According to an embodiment, appropriate thresholds must be chosen for a given criterion. For instance, with regard to the above example of nose_comfort criterion, it can be appreciated that max_area_value is a threshold $(th_2)$ for $S_2$, one of the sub-criterion thereof. In certain cases, choosing appropriate thresholds can be tricky. However, all thresholds applied herein represent a relative distance between two scales, which implies that all thresholds are not negative. In other words, a minimum value of each threshold is 0, and the only requirement is to set an appropriate upper limit for each threshold. To this end, the following method can be used to derive appropriate thresholds for each criterion.

First, a range for each threshold may be chosen according to expert knowledge. In the example of $th_2$, $th_2$ may be chosen as belonging to the range [0-50]. Next, an incremental step (is) may be set to 1 so that the approach iterates over all possibilities within the defined range, adding only a single step each iteration. The scoring algorithm may then ben run with the current value of $th_2$. A final score for all frames 1, 2, . . . , F may be obtained for each evaluator, or tester $S_1, S_2, \ldots, S_F$, and considered. In the example of $th_2$, the scores can be compared with a tester subjective score, or $$S'_1, S'_2, \ldots, S'_F,$$

A test for evaluating how well the two series of rankings (i.e. scores) can be described using a monotonic function can be applied. In an example, the test may be a Spearman's ranking between $[S_1, S_2, \ldots, S_F]$ and $$[S'_1, S'_2, \ldots, S'_F].$$

The ranking test score ranges from −1 to 1, where 1 means two series are perfectly correlated (i.e. identical), −1 means two series are perfectly negatively correlated, and 0 means there is no correlation between the two series. If a score is greater than 0.7, the two series can be considered a good match, the goal being to find a set of thresholds that ensures all scores are greater than 0.7. In this way, if any one or more thresholds lead to no significant difference on the ranking test with all good matching series, we select the more (i.e. most) strict threshold as the final threshold.

Further to the above, sub process 170 of method 105 may be implemented according to machine learning-based algorithms in order to compute comfort scores. To this end, user feedback on a 1-9 semantic scale for criterion i, for instance, illustrated above, may be collected. The criterion i may be nose comfort relative to eyeglass j, and the score may be marked as $C_{ij}$, wherein $C_{ij} \in [1,9]$. Landmark information may be related to this information. For instance, the landmark information I may be of the nose. All landmark coordinates may be marked as $N_I$, $I \in [1, L]$. $N_I$, $I \in [1, L]$ may be considered inputs and $C_{ij} \in [1, L]$ may be an output of a machine learning-based model $M_i$ that minimizes $\Sigma_j \|C_{ij}-M_i(N_I)\|$ for criterion i. The function may be iterated over all criteria i and a corresponding $M_i$ can be built according to relevant $C_{ij}$.

According to an embodiment, and in addition to the aesthetic criteria and comfort criteria outlined above, each candidate eyeglass of the eyeglass database may be evaluated in view of a felt weight, thereby providing an estimate of a perceived weight of the eyeglass based on the specific features of the face of the user. Thus, a final fit score may be a weighted score reflecting each of the aesthetic criteria, the comfort criteria, and the felt weight.

First, the eyeglasses may be ranked following a determination of a weight of the eyeglass. The weight of the eyeglass may be a summation of the weight of the eyeglass rim and the weight of each lens of the eyeglass. The weight of the lens may depend on the geometry of the lens (i.e. volume) and its material (i.e. volumetric mass). In order to obtain a geometry of the lens, (1) the geometry may be calculated knowing the $R_x$, a standard curvature chart, and the lens contour, or by (2) approximating the geometry based on a statistical value stored in the eyeglass database. Thus, the geometry of the candidate eyeglass may be determined to be an average value of similar $R_x$ groups. A weight of the lens may be determined (1) based on a volume of the lens and its material, (2) based on the average volume of the lens by $R_x$ group and material, and (3) based on the average volume of the lens by $R_x$ group and the most ordered materials.

Second, the eyeglasses can be ranked by estimating the number of contact points between a face and the eyeglass, assuming the contact points are evenly distributed on the face and the weight of the eyeglass, in the case the geometry of the lens is known by knowing the $R_x$, the standard curvature chart, and the lens contour. Thus, method described above can be used to dock the frame on the nose and estimate the number of contact points of the eyeglass on the face, wherein each contact point having its axial symmetric contact point (the axis of symmetry being the vertical nose passing through the center between the eye and the nose tip) will be attributed a score of 1. The total score can be summed and an original weight of each eyeglass can be divided by the total score. The eyeglasses can then each be ranked according to the felt weight.

Third, and assuming a 3D scan of the lens and the frame is known, the felt weight of each eyeglass can be estimated by objective criteria. To this end, methods described above can be used to dock the eyeglass on the nose. The Young models of the contact points (e.g. nosepads, bridge, temples) and the face (e.g. skin, bone) can be used to perform mechanical modeling via finite element modeling. The eyeglasses can then be ranked according to the mechanical performance.

According to an embodiment, the final fit score generated at sub process 170 of method 105 may be generated for each candidate eyeglass of the subset of eyeglasses and can be used to present one or more eyeglasses to a user. The presentation may include a display of final fit scores. Each final fit score may reflect each assessed criteria (including weighted fit scores), or a display of recommended eyeglass(es) based on the final fit scores.

In an embodiment, and as described above, each final fit score may be a combination of calculated values of comfort criteria and calculated values of aesthetic criteria. The combination may be a weighted combination of the calculated values, in an example. In another embodiment, each final fit score may include a felt weight of the candidate eyeglass, the felt weight, or perceived weight, of the candidate eyeglasses also being assigned a weight.

In the event more than one eyeglass is highly scored, the number or frames presented to the user may be modified so as not to overwhelm the user. For instance, if many frames fully satisfy a set of constraints (e.g. distance closet to 0, or maximum value of the criteria), the eyeglasses may be classified and/or sorted such that eyeglasses are displayed to the user by criterion, by type of eyeglass, and the like. Of course, if there are only a few eyeglasses that satisfy the constraints, then a number of eyeglasses displayed to the user may widened such that those that do not rank as highly are also presented. To this end, eyeglasses could be re-sorted with relaxed constraints. In another instance, method 105 may be implemented, according to an embodiment, such that the final fit score places each eyeglass into a class of eyeglasses, and then eyeglasses by class may be presented to the user.

According to an embodiment, method 105 may also strive to automatically check if a eyeglass of the catalogue is acceptable, from an aesthetics and comfort point of view, knowing a visual prescription of the user. This can include, based on knowing (1) the prescription of the user (i.e., +pupillary distance), (2) an estimation of the maximum acceptable lens thickness $E_{b\ max}$ for a user (i.e. aesthetic+weight), determined by focus groups, and (3) the index of the lens chosen by the user or assigned based on a default index that corresponds to a best sold index in a given country, region, city, state, etc. that the user may live, computing the diameter of the lens for which the maximum acceptable lens thickness is reached.

This includes following the Gullstrand formula, as below.

$$v = \frac{n_0}{f'} = (n - n_0)\left(\frac{1}{R_1} - \frac{1}{R_2}\right) + \frac{(n - n_0)^2}{n}\frac{e}{R_1 R_2}$$

where $n_0$ equals 1, $R_1$ equals $OP_1$ (i.e. radius of the front diopter of the lens), $R_2$ equals $OP_2$ (i.e. radius of the rear diopter of the lens), D is the diameter of the lens, and e is the thickness of the lens at the center of the lens.

From this, a first equation can be derived, as below:

$$R_2 = \left[\left(e * \frac{(n-1)^2}{n}\right) - R_1 * (n - 1)\right] \Big/ (V * R_1 - n + 1)$$

Moreover, $$E_b = e + R_2 - \sqrt{R_2^2 - \frac{D^2}{4}} - R_1 + \sqrt{R_1^2 - \frac{D^2}{4}}$$

From the first equation, above, an the second question, above, $D_i$ can be computed as the lens diameter at which a given edge thickness is reached (depending on $R_1$ and e).

The standard curvature chart for the lens index (either selected by the user or assumed, as explained above) enables computation of $R_1$ and e. Thus, from the maximum acceptable lens thickness $E_{b\ max}$ for a user, $D_{max}$ can be computed, wherein $D_{max}$ is the lens diameter for which this thickness is reached. $D_{max}$ can then be compared to size E, a maximal distance between the lens optical center and the lens contour (i.e useful lens diameter=size E x2). To this end, it can be appreciated that size E can (a) either be provided by the retailer or (b) or estimated from the eyeglass inner contour assuming the pupil height positioning is known (e.g size B+4).

In an embodiment, if size $E < D_{max}$, then the eyeglass is accepted, the lens thickness being estimated as acceptable from an aesthetic/comfort point of view. If, however, $D_{max} <$ size E, then the eyeglass is refused as the lens thickness is estimated to be too high to be aesthetic/comfortable.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus' refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be Supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 8:
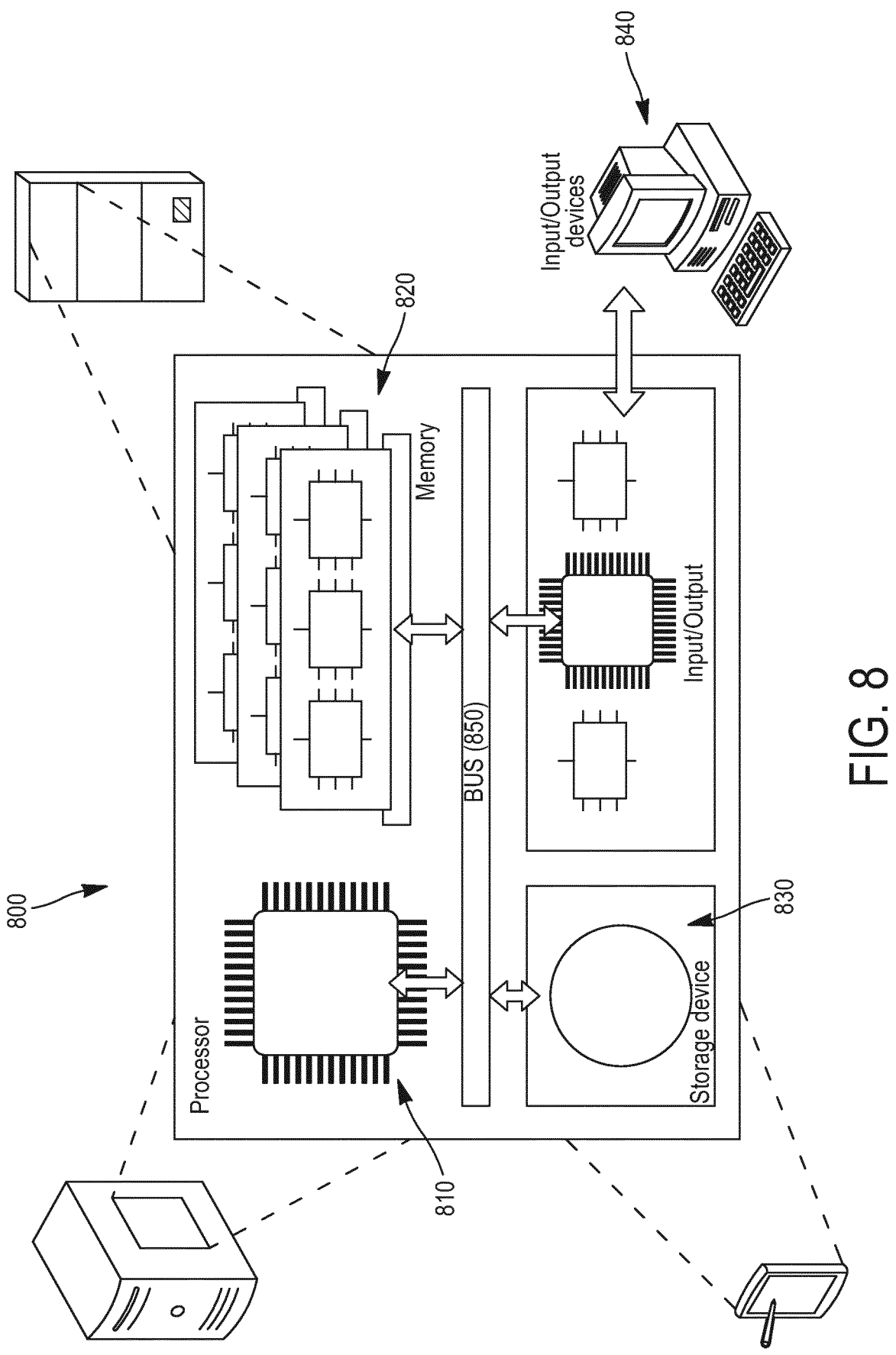
FIG. 8 is a hardware schematic of a device for performing a method of determining a fit of a visual equipment, according to an exemplary embodiment of the present disclosure.

An example of one such type of computer is shown in FIG. 8, which shows a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that Such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring Such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method for determining a fit of a visual equipment, comprising receiving, by processing circuitry, at least one image of a face of a user, identifying, by the processing circuitry, a subset of eyeglasses from a database of visual equipment that satisfy a preliminary fit threshold, the preliminary fit threshold being an anatomical characteristic of the user that is determined based on the at least one image of the face of the user, determining, by the processing circuitry and for a candidate eyeglass of the subset of eyeglasses, an eyeglass rim plane defined by a pantoscopic angle, determining, by the processing circuitry and based on the eyeglass rim plane, an eyeglass pads plane that intersects eyeglass pads of the candidate eyeglass, the eyeglass pads plane being situated at a position offset from the eyeglass rim plane by a predetermined distance, generating, by the processing circuitry, at least one two-dimensional (2D) profile of a nose of the user based on one or more facial landmarks detected in the at least one image of the face of the user and a three-dimensional (3D) nose contour estimated from the at least one image of the face of the user, the at least one 2D profile of the nose of the user including at least one of a first one of the at least one 2D profile of the nose of the user being defined as an intersection of a plane parallel to the eyeglass pads plane and the estimated 3D nose contour, the first one of the at least one 2D profile being situated at a predetermined distance from a facial reference landmark of the one or more facial landmarks, and a second one of the at least one 2D profile of the nose of the user being defined as an intersection of a plane parallel to the eyeglass rim plane and the estimated 3D nose contour, the second one of the at least one 2D profile being situated relative to the first one of the at least one 2D profile based on the predetermined distance of the offset of the eyeglass pads plane from the eyeglass rim plane, generating, by the processing circuitry and for the candidate eyeglass of the subset of eyeglasses, at least one 2D profile of a nasal section of a frame of the candidate eyeglass, a first one of the at least one 2D profile of the nasal section of the frame being associated with eyeglass pads of the candidate eyeglass and a second one of the at least one 2D profile of the nasal section of the frame being associated with an eyeglass rim of the candidate eyeglass, virtually docking, by the processing circuitry and based on the at least one 2D profile of the nose of the user and the at least one 2D profile of the nasal section of the frame of the candidate eyeglass, the candidate eyeglass on the nose of the face of the user, comparing, by the processing circuitry, locations of a feature of an eyeglass rim of the virtually docked candidate eyeglass to a subset of the one or more facial landmarks detected in the at least one image of the face of the user, and calculating, by the processing circuitry and when the virtually docked candidate eyeglass satisfies a secondary fit threshold, a final fit of the virtually docked candidate eyeglass on the nose of the user, the final fit of the virtually docked candidate eyeglass being defined by at least one of a comfort criterion and/or an aesthetic criterion.

(2) The method of (1), further comprising combining, by the processing circuitry and in order to calculate the final fit of the virtually docked candidate eyeglass on the nose of the user, calculated values for each of a plurality of comfort criteria and/or calculated values for each of a plurality of aesthetic criteria.

(3) The method of either (1) or (2), wherein the combining includes calculating, by the processing circuitry, a weighted sum of the calculated values for each of the plurality of comfort criteria, and/or calculating, by the processing circuitry, a weighted sum of the calculated values for each of the plurality of aesthetic criteria.

(4) The method of any one of (1) to (3), further comprising iteratively performing, by the processing circuitry and for each remaining eyeglass of the subset of eyeglasses, the determining the eyeglass rim plane, the determining the eyeglass pads plane, the generating the at least one 2D profile of the nasal section of the frame of the candidate eyeglass, the virtually docking, the comparing, and the calculating.

(5) The method of any one of (1) to (4), further comprising ranking, by the processing circuitry, each virtually docked candidate eyeglass that satisfies the secondary fit threshold based on a comparison of a final fit of each virtually docked candidate eyeglass.

(6) The method of any one of (1) to (5), further comprising generating, by the processing circuitry and based on the ranking, a visual equipment recommendation for the user.

(7) The method of any one of (1) to (6), wherein a position of the virtually docked candidate eyeglass is calculated by optimizing a relationship between the first one of the at least one 2D profile of the nose of the user and the first one of the at least one 2D profile of the nasal section of the frame associated with the eyeglass pads of the candidate eyeglass in view of a second one of the at least one 2D profile of the nose of the user and the second one of the at least one 2D profile of the nasal section of the frame associated with the eyeglass rim of the candidate eyeglass, the second one of the at least one 2D profile of the nose of the user being associated with an intersection of the eyeglass rim plane and the estimated 3D nose contour.

(8) The method of any one of (1) to (7), wherein the generating the first one of the at least one 2D profile of the nose of the user includes generating, by the processing circuitry, a subsequent one of the at least one 2D profile of the nose of the user corresponding to a posterior nose plane of the user, the posterior nose plane being associated with an axis extending through a most posterior aspect of the nose of the user, and performing, by the processing circuitry, a transformation on the subsequent one of the at least one 2D profile of the nose of the user, a result of the transformation being the first one of the at least one 2D profile of the nose of the user, the transformation including a nose splay angle.

(9) The method of any one of (1) to (8), wherein the at least one 2D profile of the nasal section of the frame of the candidate eyeglass includes a plurality of 2D profiles associated with positions of mobile eyeglass pads of the candidate eyeglass, each of the plurality of 2D profiles being a configuration of the candidate eyeglass and representing a possible position of the mobile eyeglass pads of the candidate eyeglass.

(10) The method of any one of (1) to (9), wherein the determining the eyeglass pads plane, the virtually docking, the comparing, and the calculating are performed for each configuration of the candidate eyeglass, each configuration of the candidate eyeglass being an additional candidate eyeglass.

(11) The method of any one of (1) to (10), wherein the anatomical characteristic of the user is determined as a distance between temples of the user or as a distance between ears of the user.

(12) The method of any one of (1) to (11), wherein the eyeglass rim plane is further defined by a vertex distance.

(13) An apparatus for determining a fit of a visual equipment, comprising processing circuitry configured to receive at least one image of a face of a user, identify a subset of eyeglasses from a database of visual equipment that satisfy a preliminary fit threshold, the preliminary fit threshold being an anatomical characteristic of the user that is determined based on the at least one image of the face of the user, determine, for a candidate eyeglass of the subset of eyeglasses, an eyeglass rim plane defined by a pantoscopic angle, determine, based on the eyeglass rim plane, an eyeglass pads plane that intersects eyeglass pads of the candidate eyeglass, the eyeglass pads plane being situated at a position offset from the eyeglass rim plane by a predetermined distance, generate at least one two-dimensional (2D) profile of a nose of the user based on one or more facial landmarks detected in the at least one image of the face of the user and a three-dimensional (3D) nose contour estimated from the at least one image of the face of the user, the at least one 2D profile of the nose of the user including at least one of a first one of the at least one 2D profile of the nose of the user being defined as an intersection of a plane parallel to the eyeglass pads plane and the estimated 3D nose contour, the first one of the at least one 2D profile being situated at a predetermined distance from a facial reference landmark of the one or more facial landmarks, and a second one of the at least one 2D profile of the nose of the user being defined as an intersection of a plane parallel to the eyeglass rim plane and the estimated 3D nose contour, the second one of the at least one 2D profile being situated relative to the first one of the at least one 2D profile based on the predetermined distance of the offset of the eyeglass pads plane from the eyeglass rim plane, generate, for the candidate eyeglass of the subset of eyeglasses, at least one 2D profile of a nasal section of a frame of the candidate eyeglass, a first one of the at least one 2D profile of the nasal section of the frame being associated with eyeglass pads of the candidate eyeglass and a second one of the at least one 2D profile of the nasal section of the frame being associated with an eyeglass rim of the candidate eyeglass, virtually dock, based on the at least one 2D profile of the nose of the user and the at least one 2D profile of the nasal section of the frame of the candidate eyeglass, the candidate eyeglass on the nose of the face of the user, compare locations of a feature of an eyeglass rim of the virtually docked candidate eyeglass to a subset of the one or more facial landmarks detected in the at least one image of the face of the user, and calculate, when the virtually docked candidate eyeglass satisfies a secondary fit threshold, a final fit of the virtually docked candidate eyeglass on the nose of the user, the final fit of the virtually docked candidate eyeglass being defined by at least one of a comfort criterion and/or an aesthetic criterion.

(14) The apparatus of (13), wherein the processing circuitry is further configured to combine, in order to calculate the final fit of the virtually docked candidate eyeglass on the nose of the user, by calculating a weighted sum of calculated values for each of a plurality of comfort criteria, and calculating a weighted sum of calculated values for each of a plurality of aesthetic criteria.

(15) The apparatus of either (13) or (14), wherein the processing circuitry is further configured to rank each virtually docked candidate eyeglass that satisfies the secondary fit threshold based on a comparison of a final fit of each virtually docked candidate eyeglass, and generate, based on the ranking, a visual equipment recommendation for the user.

(16) The apparatus of any one of (13) to (15), wherein a position of the virtually docked candidate eyeglass is calculated by optimizing a relationship between the first one of the at least one 2D profile of the nose of the user and the first one of the at least one 2D profile of the nasal section of the frame associated with the eyeglass rim of the candidate eyeglass in view of a second one of the at least one 2D profile of the nose of the user and the second one of the at least one 2D profile of the nasal section of the frame associated with the eyeglass rim of the candidate eyeglass, the second one of the at least one 2D profile of the nose of the user being associated with an intersection of the eyeglass rim plane and the estimated 3D nose contour.

(17) The apparatus of any one of (13) to (16), wherein the processing circuitry is configured to generate the first one of the at least one 2D profile of the nose of the user by generating a subsequent one of the at least one 2D profile of the nose of the user corresponding to a posterior nose plane of the user, the posterior nose plane being associated with a vertical axis extending through a most posterior aspect of the nose of the user, and performing a transformation on the subsequent one of the at least one 2D profile of the nose of the user, a result of the transformation being the first one of the at least one 2D profile of the nose of the user, the transformation including a nose splay angle.

(18) The apparatus of any one of (13) to (17), wherein the at least one 2D profile of the nasal section of the frame of the candidate eyeglass includes a plurality of 2D profiles associated with positions of mobile eyeglass pads of the candidate eyeglass, each of the plurality of 2D profiles being a configuration of the candidate eyeglass and representing a possible position of the mobile eyeglass pads of the candidate eyeglass.

(19) The apparatus of any one of (13) to (18), wherein the processing circuitry is further configured to perform, for each configuration of the candidate eyeglass, the determine the eyeglass pads plane, the virtually dock, the compare, and the calculate, each configuration of the candidate eyeglass being an additional candidate eyeglass.

(20) The apparatus of any one of (13) to (19), wherein the anatomical characteristic of the user is determined as a distance between temples of the user or as a distance between ears of the user.

(21) The apparatus of any one of (13) to (20), wherein the eyeglass rim plane is further defined by a vertex distance.

(22) A non-transitory computer-readable storage medium storing computer-readable instructions that, when executed by a computer, cause the computer to perform a method for determining a fit of a visual equipment, comprising receiving at least one image of a face of a user, identifying a subset of eyeglasses from a database of visual equipment that satisfy a preliminary fit threshold, the preliminary fit threshold being an anatomical characteristic of the user that is determined based on the at least one image of the face of the user, determining, for a candidate eyeglass of the subset of eyeglasses, an eyeglass rim plane defined by a pantoscopic angle, determining, based on the eyeglass rim plane, an eyeglass pads plane that intersects eyeglass pads of the candidate eyeglass, the eyeglass pads plane being situated at a position offset from the eyeglass rim plane by a predetermined distance, generating at least one two-dimensional (2D) profile of a nose of the user based on one or more facial landmarks detected in the at least one image of the face of the user and a three-dimensional (3D) nose contour estimated from the at least one image of the face of the user, the at least one 2D profile of the nose of the user including at least one of a first one of the at least one 2D profile of the nose of the user being defined as an intersection of a plane parallel to the eyeglass pads plane and the estimated 3D nose contour, the first one of the at least one 2D profile being situated at a predetermined distance from a facial reference landmark of the one or more facial landmarks, and a second one of the at least one 2D profile of the nose of the user being defined as an intersection of a plane parallel to the eyeglass rim plane and the estimated 3D nose contour, the second one of the at least one 2D profile being situated relative to the first one of the at least one 2D profile based on the predetermined distance of the offset of the eyeglass pads plane from the eyeglass rim plane, generating, for the candidate eyeglass of the subset of eyeglasses, at least one 2D profile of a nasal section of a frame of the candidate eyeglass, a first one of the at least one 2D profile of the nasal section of the frame being associated with eyeglass pads of the candidate eyeglass and a second one of the at least one 2D profile of the nasal section of the frame being associated with an eyeglass rim of the candidate eyeglass, virtually docking, based on the at least one 2D profile of the nose of the user and the at least one 2D profile of the nasal section of the frame of the candidate eyeglass, the candidate eyeglass on the nose of the face of the user, comparing locations of a feature of an eyeglass rim of the virtually docked candidate eyeglass to a subset of the one or more facial landmarks detected in the at least one image of the face of the user, and calculating, when the virtually docked candidate eyeglass satisfies a secondary fit threshold, a final fit of the virtually docked candidate eyeglass on the nose of the user, the final fit of the virtually docked candidate eyeglass being defined by at least one of a comfort criterion and/or an aesthetic criterion.

Thus, the foregoing discussion discloses and describes merely exemplary embodiments. As will be understood by those skilled in the art, the present disclosure may be embodied in other specific forms without departing from the spirit or essential characteristics thereof. Accordingly, the disclosure is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for determining a fit of a visual equipment, comprising:

receiving, by processing circuitry, at least one image of a face of a user;

identifying, by the processing circuitry, a subset of eyeglasses from a database of visual equipment that satisfy a preliminary fit threshold, the preliminary fit threshold being a deviation limit of a parameter of the eyeglasses from a corresponding anatomical parameter of the face of the user, wherein whether an eyeglass of the database does or does not satisfy the preliminary fit threshold is determined by comparing the parameter of the eyeglasses with the corresponding anatomical parameter of the face of the user and by eliminating the eyeglass when the preliminary fit threshold is exceeded, the comparing being related to comfort, which is based on an adaptation of the eyeglasses to a facial width of the user, and/or being related to aesthetics, which is based on an adaptation of the eyeglasses to a user facial shape and/or skin color and/or eye color;

determining, by the processing circuitry and for a candidate eyeglass of the subset of eyeglasses, an eyeglass rim plane defined by a pantoscopic angle;

determining, by the processing circuitry and based on the eyeglass rim plane, an eyeglass pads plane that intersects eyeglass pads of the candidate eyeglass, the eyeglass pads plane being situated at a position offset from the eyeglass rim plane by a predetermined distance;

generating, by the processing circuitry, at least one two-dimensional (2D) profile of a nose of the user based on one or more facial landmarks detected in the at least one image of the face of the user and a three-dimensional (3D) nose contour estimated from the at least one image of the face of the user, the at least one 2D profile of the nose of the user including at least one of:

a first one of the at least one 2D profile of the nose of the user being defined as an intersection of a plane parallel to the eyeglass pads plane and the estimated 3D nose contour, the first one of the at least one 2D profile being situated at a predetermined distance from a facial reference landmark of the one or more facial landmarks, and a second one of the at least one 2D profile of the nose of the user being defined as an intersection of a plane parallel to the eyeglass rim plane and the estimated 3D nose contour, the second one of the at least one 2D profile being situated relative to the first one of the at least one 2D profile based on the predetermined distance of the offset of the eyeglass pads plane from the eyeglass rim plane;

generating, by the processing circuitry and for the candidate eyeglass of the subset of eyeglasses, at least one 2D profile of a nasal section of a frame of the candidate eyeglass, a first one of the at least one 2D profile of the nasal section of the frame being associated with eyeglass pads of the candidate eyeglass and a second one of the at least one 2D profile of the nasal section of the frame being associated with an eyeglass rim of the candidate eyeglass;

virtually docking, by the processing circuitry and based on the at least one 2D profile of the nose of the user and the at least one 2D profile of the nasal section of the frame of the candidate eyeglass, the candidate eyeglass on the nose of the face of the user;

comparing, by the processing circuitry, locations of a feature of an eyeglass rim of the virtually docked candidate eyeglass to a subset of the one or more facial landmarks detected in the at least one image of the face of the user; and calculating, by the processing circuitry and when the virtually docked candidate eyeglass satisfies a secondary fit threshold representing a distance between global reference positions of the eyeglass and the face of the user, a final fit of the virtually docked candidate eyeglass on the nose of the user, the final fit of the virtually docked candidate eyeglass being a score, which is a result of a scoring function obtained by:

defining comfort and/or aesthetic criteria, defining an evaluation function measuring the defined comfort and/or aesthetic criteria, wherein inputs include one or more morphological features of the face of the user, or of the eyeglass, defining a target value representing an ideal result of the evaluation function, and defining the scoring function that evaluates the distance between a result of the evaluation function and the ideal result.

2. The method of claim 1, further comprising combining, by the processing circuitry and in order to calculate the final fit of the virtually docked candidate eyeglass on the nose of the user, calculated values for each of a plurality of comfort criteria and/or calculated values for each of a plurality of aesthetic criteria.

3. The method of claim 2, wherein the combining includes calculating, by the processing circuitry, a weighted sum of the calculated values for each of the plurality of comfort criteria, and/or calculating, by the processing circuitry, a weighted sum of the calculated values for each of the plurality of aesthetic criteria.

4. The method of claim 1, further comprising iteratively performing, by the processing circuitry and for each remaining eyeglass of the subset of eyeglasses, the determining the eyeglass rim plane, the determining the eyeglass pads plane, the generating the at least one 2D profile of the nasal section of the frame of the candidate eyeglass, the virtually docking, the comparing, and the calculating.

5. The method of claim 4, further comprising ranking, by the processing circuitry, each virtually docked candidate eyeglass that satisfies the secondary fit threshold based on a comparison of a final fit of each virtually docked candidate eyeglass.

6. The method of claim 5, further comprising generating, by the processing circuitry and based on the ranking, a visual equipment recommendation for the user.

7. The method of claim 4, wherein the at least one 2D profile of the nasal section of the frame of the candidate eyeglass includes a plurality of 2D profiles associated with positions of mobile eyeglass pads of the candidate eyeglass, each of the plurality of 2D profiles being a configuration of the candidate eyeglass and representing a possible position of the mobile eyeglass pads of the candidate eyeglass.

8. The method of claim 7, wherein the determining the eyeglass pads plane, the virtually docking, the comparing, and the calculating are performed for each configuration of the candidate eyeglass, each configuration of the candidate eyeglass being an additional candidate eyeglass.

9. The method of claim 1, wherein a position of the virtually docked candidate eyeglass is calculated by optimizing a relationship between the first one of the at least one 2D profile of the nose of the user and the first one of the at least one 2D profile of the nasal section of the frame associated with the eyeglass pads of the candidate eyeglass in view of a second one of the at least one 2D profile of the nose of the user and the second one of the at least one 2D profile of the nasal section of the frame associated with the eyeglass rim of the candidate eyeglass, the second one of the at least one 2D profile of the nose of the user being associated with an intersection of the eyeglass rim plane and the estimated 3D nose contour.

10. The method of claim 1, wherein the generating the first one of the at least one 2D profile of the nose of the user includes generating, by the processing circuitry, a subsequent one of the at least one 2D profile of the nose of the user corresponding to a posterior nose plane of the user, the posterior nose plane being associated with an axis extending through a most posterior aspect of the nose of the user, and performing, by the processing circuitry, a transformation on the subsequent one of the at least one 2D profile of the nose of the user, a result of the transformation being the first one of the at least one 2D profile of the nose of the user, the transformation including a nose splay angle.

11. The method of claim 1, wherein an anatomical characteristic of the user is determined as a distance between temples of the user or as a distance between ears of the user.

12. The method of claim 1, wherein the eyeglass rim plane is further defined by a vertex distance.

13. An apparatus for determining a fit of a visual equipment, comprising:

processing circuitry configured to receive at least one image of a face of a user, identify a subset of eyeglasses from a database of visual equipment that satisfy a preliminary fit threshold, the preliminary fit threshold being a deviation limit of a parameter of the eyeglasses from a corresponding anatomical parameter of the face of the user, wherein whether an eyeglass of the database does or does not satisfy the preliminary fit threshold is determined by comparing the parameter of the eyeglasses with the corresponding anatomical parameter of the face of the user and by eliminating the eyeglass when the preliminary fit threshold is exceeded, the comparing being related to comfort, which is based on an adaptation of the eyeglasses to a facial width of a user, and/or being related to aesthetics, which is based on an adaptation of the eyeglasses to a user facial shape and/or skin color and/or eye color, determine, for a candidate eyeglass of the subset of eyeglasses, an eyeglass rim plane defined by a pantoscopic angle, determine, based on the eyeglass rim plane, an eyeglass pads plane that intersects eyeglass pads of the candidate eyeglass, the eyeglass pads plane being situated at a position offset from the eyeglass rim plane by a predetermined distance, generate at least one two-dimensional (2D) profile of a nose of the user based on one or more facial landmarks detected in the at least one image of the face of the user and a three-dimensional (3D) nose contour estimated from the at least one image of the face of the user, the at least one 2D profile of the nose of the user including at least one of:

a first one of the at least one 2D profile of the nose of the user being defined as an intersection of a plane parallel to the eyeglass pads plane and the estimated 3D nose contour, the first one of the at least one 2D profile being situated at a predetermined distance from a facial reference landmark of the one or more facial landmarks, and a second one of the at least one 2D profile of the nose of the user being defined as an intersection of a plane parallel to the eyeglass rim plane and the estimated 3D nose contour, the second one of the at least one 2D profile being situated relative to the first one of the at least one 2D profile based on the predetermined distance of the offset of the eyeglass pads plane from the eyeglass rim plane, generate, for the candidate eyeglass of the subset of eyeglasses, at least one 2D profile of a nasal section of a frame of the candidate eyeglass, a first one of the at least one 2D profile of the nasal section of the frame being associated with eyeglass pads of the candidate eyeglass and a second one of the at least one 2D profile of the nasal section of the frame being associated with an eyeglass rim of the candidate eyeglass, virtually dock, based on the at least one 2D profile of the nose of the user and the at least one 2D profile of the nasal section of the frame of the candidate eyeglass, the candidate eyeglass on the nose of the face of the user, compare locations of a feature of an eyeglass rim of the virtually docked candidate eyeglass to a subset of the one or more facial landmarks detected in the at least one image of the face of the user, and calculate, when the virtually docked candidate eyeglass satisfies a secondary fit threshold representing a distance between global reference positions of the eyeglass and the face of the user, a final fit of the virtually docked candidate eyeglass on the nose of the user, the final fit of the virtually docked candidate eyeglass being a score, which is a result of a scoring function obtained by:

defining comfort and/or aesthetic criteria, defining an evaluation function measuring the defined comfort and/or aesthetic criteria, wherein inputs include one or more morphological features of the face of the user, or of the eyeglass, defining a target value representing an ideal result of the evaluation function, and defining the scoring function that evaluates the distance between a result of the evaluation function and the ideal result.

14. The apparatus of claim 13, wherein the processing circuitry is further configured to rank each virtually docked candidate eyeglass that satisfies the secondary fit threshold based on a comparison of a final fit of each virtually docked candidate eyeglass, and generate, based on the ranking, a visual equipment recommendation for the user.

15. A non-transitory computer-readable storage medium storing computer-readable instructions that, when executed by processing circuitry of a computer, cause the computer to perform a method for determining a fit of a visual equipment, the method comprising:

receiving at least one image of a face of a user;

identifying a subset of eyeglasses from a database of visual equipment that satisfy a preliminary fit threshold, the preliminary fit threshold being a deviation limit of a parameter of the eyeglasses from a corresponding anatomical parameter of the face of the user, wherein whether an eyeglass of the database does or does not satisfy the preliminary fit threshold is determined by comparing the parameter of the eyeglasses with the corresponding anatomical parameter of the face of the user and by eliminating the eyeglass when the preliminary fit threshold is exceeded, the comparing being related to comfort, which is based on an adaptation of the eyeglasses to a facial width of the user, and/or being related to aesthetics, which is based on an adaptation of the eyeglasses to a user facial shape and/or skin color and/or eye color;

determining, for a candidate eyeglass of the subset of eyeglasses, an eyeglass rim plane defined by a pantoscopic angle;

determining, based on the eyeglass rim plane, an eyeglass pads plane that intersects eyeglass pads of the candidate eyeglass, the eyeglass pads plane being situated at a position offset from the eyeglass rim plane by a predetermined distance;

generating at least one two-dimensional (2D) profile of a nose of the user based on one or more facial landmarks detected in the at least one image of the face of the user and a three-dimensional (3D) nose contour estimated from the at least one image of the face of the user, the at least one 2D profile of the nose of the user including at least one of:

a first one of the at least one 2D profile of the nose of the user being defined as an intersection of a plane parallel to the eyeglass pads plane and the estimated 3D nose contour, the first one of the at least one 2D profile being situated at a predetermined distance from a facial reference landmark of the one or more facial landmarks, and a second one of the at least one 2D profile of the nose of the user being defined as an intersection of a plane parallel to the eyeglass rim plane and the estimated 3D nose contour, the second one of the at least one 2D profile being situated relative to the first one of the at least one 2D profile based on the predetermined distance of the offset of the eyeglass pads plane from the eyeglass rim plane;

generating, for the candidate eyeglass of the subset of eyeglasses, at least one 2D profile of a nasal section of a frame of the candidate eyeglass, a first one of the at least one 2D profile of the nasal section of the frame being associated with eyeglass pads of the candidate eyeglass and a second one of the at least one 2D profile of the nasal section of the frame being associated with an eyeglass rim of the candidate eyeglass;

virtually docking, based on the at least one 2D profile of the nose of the user and the at least one 2D profile of the nasal section of the frame of the candidate eyeglass, the candidate eyeglass on the nose of the face of the user;

comparing locations of a feature of an eyeglass rim of the virtually docked candidate eyeglass to a subset of the one or more facial landmarks detected in the at least one image of the face of the user; and calculating, when the virtually docked candidate eyeglass satisfies a secondary fit threshold representing a distance between global reference positions of the eyeglass and the face of the user, a final fit of the virtually docked candidate eyeglass on the nose of the user, the final fit of the virtually docked candidate eyeglass being a score, which is a result of a scoring function obtained by:

defining comfort and/or aesthetic criteria, defining an evaluation function measuring the defined comfort and/or aesthetic criteria, wherein inputs include one or more morphological features of the face of the user, or of the eyeglass, defining a target value representing an ideal result of the evaluation function, and defining the scoring function that evaluates the distance between a result of the evaluation function and the ideal result.

* * * * *